United States Patent [19]
Iwatani et al.

[11] Patent Number: 5,581,172
[45] Date of Patent: Dec. 3, 1996

[54] APPARATUS FOR CONTROLLING OUTPUT OF VEHICULAR AC GENERATOR

[75] Inventors: Shirou Iwatani; Keiichi Komurasaki; Hirofumi Watanabe; Tatsuki Kouwa; Katsunori Tanaka, all of Himeji, Japan

[73] Assignee: Mitsubishi Denki Kabushiki Kaisha, Tokyo, Japan

[21] Appl. No.: 362,901

[22] Filed: Dec. 23, 1994

[30] Foreign Application Priority Data

Dec. 28, 1993 [JP] Japan .................... 5-338324

[51] Int. Cl.⁶ ................................... H02J 7/14
[52] U.S. Cl. ................... 322/28; 322/24; 322/99
[58] Field of Search .................. 322/7, 24, 27, 322/28

[56] References Cited

U.S. PATENT DOCUMENTS

| | | | |
|---|---|---|---|
| 4,777,425 | 10/1988 | MacFarlane | 322/28 |
| 5,225,764 | 7/1993 | Falater | 322/28 |
| 5,256,959 | 10/1993 | Nagano et al. | 322/25 |
| 5,444,354 | 8/1995 | Ttakahashi et al. | 322/28 |
| 5,467,008 | 11/1995 | Uchinami | 322/27 |
| 5,481,176 | 1/1996 | DeBiasi et al. | 322/7 |
| 5,483,146 | 1/1996 | Schultz et al. | 322/7 |
| 5,491,400 | 2/1996 | Iwatani et al. | 322/28 |
| 5,497,071 | 3/1996 | Iwatani et al. | 322/28 |

FOREIGN PATENT DOCUMENTS

| | | |
|---|---|---|
| 0139429 | 5/1985 | European Pat. Off. . |
| 4038301 | 6/1991 | Germany . |
| 197045 | 7/1992 | Japan . |

Primary Examiner—Steven L. Stephan
Assistant Examiner—Nicholas Ponomarenko
Attorney, Agent, or Firm—Sughrue, Mion, Zinn, Macpeak & Seas

[57] ABSTRACT

An apparatus for controlling an output from an AC generator for a vehicle is provided which enables wiring from an external control unit to a voltage regulator by using only one wiring line, and which is capable of adjusting an output voltage of the AC generator to a usual value in accordance with a duty ratio of a control signal supplied from the external control unit, and linearly controlling the generator output voltage to a desired value in relation to a change in the level of the control signal. The apparatus includes a control unit connected to a battery and a variety of sensors mounted on a vehicle for generating a control signal which has a duty ratio corresponding to a sensed operating condition of the vehicle; and a voltage regulator connected to the battery and the control unit for detecting an output voltage of the battery and controlling turning on and off of a field current supplied from the battery to a field coil of the AC generator in accordance with the detected battery voltage so as to adjust an output voltage of the AC generator to a level that is determined in accordance with the duty ratio of the control signal from the external control unit.

16 Claims, 18 Drawing Sheets

| DUTY SIGNAL (%) COMPARATOR GATE | 0 | 10 | 50 | 90 | 100 |
|---|---|---|---|---|---|
| a |  | L | H | H | H |
| b |  | L | L | H | H |
| c |  | L | L | L | H |
| d |  | L | H | H | H |
| e |  | H | L | H | H |
| f |  | H | H | L | H |
| g |  | H | H | H | L |

CONTROL SIGNAL LEVEL
(DUTY RATIO)

APPARATUS FOR CONTROLLING OUTPUT OF VEHICULAR AC GENERATOR

BACKGROUND OF THE INVENTION

1. Field of the Invention

This invention relates to an apparatus for controlling an output of an AC generator for a vehicle of the type which is adapted to control the output voltage of the AC generator in accordance with the level of an electric signal supplied from an external control unit.

2. Description of the Related Art

FIG. 18 is a diagram which illustrates the construction of a conventional apparatus for controlling an output of an AC generator for a vehicle as disclosed in, for example, Japanese Patent Laid-Open No. 62-107643. An AC generator 1 driven by an engine (not shown) comprises an armature coil 101 and a field coil 102. A rectifier 2 rectifies all waves of the AC output from the AC generator 1 to transmit the rectified output through a positive terminal 201 and a negative terminal 202 thereof. A voltage regulator 3-1 controls the rectified output from the AC generator 1 to a predetermined value. An external control unit 4 receives signals indicating the state of operation of a vehicle in the form of an automobile from a variety of sensors SE1 to SE4 attached thereto to transmit an output instruction signal to the voltage regulator 3-1.

A battery 5 is electrically charged with an output from the AC generator 1 through the rectifier 2. An electric load 6 of the automobile is supplied with electric power from the battery 5 through an electric load switch 7. Upon closing of a key switch 8, voltage is supplied through the key switch 8 from the battery 5 to a constant-voltage circuit VS in the voltage regulator 3-1. A stabilized voltage output by the constant-voltage circuit VS is used as a comparative reference voltage (hereinafter called "reference voltage") Vc for the voltage of the battery 5 to be described later. The voltage regulator 3-1 includes: a series circuit comprising voltage dividing resistors R3a and R3b connected in series between the positive terminal of the battery 5 and the ground; a series circuit comprising a resistor R1 and a transistor Q4 connected in parallel to the voltage dividing resistor R3b, an end of which is connected to the ground; a series circuit comprising a resistor R2 and a transistor Q1; and a capacitor CA. The voltage regulator 3-1 further includes a comparator CP, whose positive input terminal receives a divided voltage $V_A$ of a generator output voltage $V_G$ appearing at a connection point between the voltage dividing resistors R3a and R3b and whose negative input terminal receives the reference voltage VC supplied from the constant-voltage circuit VS to generate a high- or low-level comparison signal through a resistor R4 connected to the output terminal thereof.

It is to be noted that the base of each of the transistors Q1 and Q4 is supplied from the external control unit 4 with a logic signal, the level of which corresponds to the state of the operation of the automobile.

The voltage regulator 3-1 further includes: an RC series circuit comprising a resistor R5 connected in series between the positive terminal and the negative terminal of the rectifier 2 through the external connection terminal and a capacitor CA with a connection point connected to an output resistor of the comparator CP; a series circuit comprising a resistor R6 connected in series to the collector of a transistor Q2 whose base receives a comparison signal from the connection point of the RC series circuit; and a series circuit comprising a diode D1 connected in series to the collector of a transistor Q3, the base of which receives voltage developed between the collector resistor R6 and the base.

The diode D1 is connected in parallel to the field coil 102 through an external connection terminal to absorb a surge which is generated when the field coil 102 is turned off. Since the structure of the external control unit 4 is substantially unrelated to the present invention, the description of the operation of the external control unit 4 is omitted here.

The operation of the above-described conventional apparatus will now be described.

When a driver of the automobile turns on the key switch 8 to start the engine, the voltage of the battery 5 is supplied from the battery 5 to the constant-voltage circuit VS through an ignition terminal so that the reference voltage Vc is generated. The reference voltage Vc is supplied to the negative input terminal of the comparator CP for comparison with the divided voltage $V_A$ of the generator output voltage $V_G$ received by the positive input terminal.

When the divided voltage $V_A$ is lower than the reference voltage VC set in the constant-voltage circuit VS, the output level from the comparator CP is low before the low level signal is supplied to the base of the transistor Q2 so that the transistor Q2 is turned off. As a result, the ensuing transistor Q3 is turned on with a potential developed across the resistor R6 connected to the base of the transistor Q3.

When the transistor Q3 is turned on, a loop passing the positive terminal of the rectifier 2, the field coil 102, the transistor Q3 and ground is formed. Then, a field current flows from the battery 5 to the field coil 102 of the AC generator 1 to thereby start generation of electric power. When the rotational speed of the AC generator 1 has been increased due to the start of the engine rotation, the generator output voltage $V_G$ detected at the positive terminal of the rectifier 2 increases.

As a result, the divided voltage $V_A$ obtained by dividing the generator output voltage $V_G$ with the voltage dividing resistors R3a and R3b increases above the reference voltage Vc. Therefore, the level of the output from the comparator CP becomes high and the high-level output is received by the base of the transistor Q2 so that the transistor Q2 is turned on. When the transistor Q2 is turned on, the transistor Q3 is turned off to break up the field current loop, thus reducing the field current and hence the voltage $V_G$ generated by the AC generator 1.

When reduction in the generator output voltage $V_G$ below the reference voltage Vc has been detected from the output of the comparator CP, the transistor Q2 is again turned off and the transistor Q3 is again turned on. Thus, the field current starts flowing. By repeated turning on and off of the field current as described above, the generator output voltage $V_G$ can be controlled to a predetermined level. Thus, the voltage of the battery 5 charged by the AC generator 1 can be controlled to a substantially constant level.

However, when the AC generator 1 is operated by the engine, the output of the generator output power must be controlled in accordance with the state of operation or driving of the automobile in order to reduce the engine load. Accordingly, the generator output voltage is switched over into three levels in accordance with the engine load and the running speed of the automobile so as to control the output power generated by the AC generator 1. The three levels includes a low level in which the generator output voltage is lower than a first predetermined value, a high level in which the generator output voltage is higher than a second predetermined value larger than the first predetermined value, and an intermediate or usual level in which the generator output voltage is equal to or between the first and second predetermined level.

If the generator output is set to the low level which is lower than the usual or intermediate level, the external control unit 4 supplies signals for turning the transistors Q1 and Q4 off to the bases thereof. Thus, the divided voltage $V_A$ is determined in accordance with only the ratio of the resistance values of the voltage dividing resistors R3a and R3b, as given by the following equation:

$$V_A = V_G(R3a/(R3a+R3b))$$

Thus, the output power of the AC generator 1 is set to the level lower than the usual level.

If the output power of the AC generator 1 is set to the usual level, the external control unit 4 supplies a signal for turning the transistor Q4 on to the base thereof and a signal for turning the transistor Q1 off to the base thereof. As a result, the resistor R2 is connected in parallel to the voltage dividing resistor R3b, so the divided voltage $V_A$ is given by the following equation:

$$V_A = V_G((R2 \cdot R3b)/(R2 \cdot R3b + R3a))$$

where R2·R3b is a parallel resistance value of the resistor R2 and the resistor R3b. Thus, the generator output power is set to the usual level.

If the output power of the AC generator 1 is set to the level higher than the usual or intermediate level, the external control unit 4 supplies a signal for turning the transistor Q4 on to the base thereof and a signal for turning the transistor Q1 on to the base thereof. As a result, the resistors R1 and R2 are connected in parallel to the voltage dividing resistor R3b, thus providing the divided voltage $V_A$ as follows:

$$V_A = V_G((R1 \cdot R2 \cdot R3b)/(R1 \cdot R2 \cdot R3b + R3a))$$

where R1·R2·R3b is a parallel resistance value of the resistors R1, R2 and R3b. Accordingly, the generator output power is set to the level higher than the usual or intermediate level.

Therefore, the level of the divided voltage $V_A$ is made to be any of the three levels in accordance with the logic (whether the level is "High" or "Low") of the signals respectively supplied to the bases of the transistors Q1 and Q4. Thus, the generator output power can be adjusted to any of the three levels.

In the conventional apparatus, the generator output power is controlled to adjust the voltage for electrically charging the battery 5 in such a manner that a resistor is connected in parallel to any of the plurality of resistors connected in series so as to change the divided voltage to thereby alter the level of the generator output voltage.

However, another apparatus of a simpler circuit arrangement may be available in which one of the voltage dividing resistors is short-circuited by turning on an associated transistor to change the divided voltage, thus adjusting the generator output power.

FIG. 19 is a diagram which illustrates the arrangement of such an apparatus which is known to the inventors of the present invention. Referring to FIG. 19, the like reference numerals as those shown in FIG. 18 represent the same or corresponding elements. A voltage regulator 3-2 comprises: resistors 301 to 303 connected in series between the positive terminal of the battery 5 and ground so as to serve as voltage dividing resistors; and a transistor Q1a having a collector and an emitter respectively connected to the opposite ends of the resistor 303 with one end thereof grounded and a base which receives a high-level or low-level signal from the external control unit 4. The voltage regulator 3-2 further comprises: a Zener diode ZD1, the cathode of which is connected to the connection point between the voltage dividing resistors 301 and 302 and which is made electrically conductive when the divided voltage $V_A$ increases above a breakdown voltage level thereof; and a transistor Q2, the base of which is connected to the anode of the Zener diode ZD1, the emitter of which is grounded and the collector of which is connected to the output terminal of the key switch 8 through the resistor 304.

The base of the transistor Q1a, which constitutes part of the voltage regulator 3-2, is connected through a resistor 300 to the output terminal of the key switch 8, whereas the collector of the transistor Q2 is connected to the base of the transistor Q3. When the key switch 8 is switched on upon start of the engine, a current is supplied from the battery 5 to the transistors Q1a and Q3 so that the transistors Q1a and Q3 are thereby turned on.

The operation of this apparatus will now be described. When the key switch 8 is closed upon engine starting, an electric current flows from the battery 5 to the base of the transistor Q3 through the resistor 304 of the voltage regulator 3-2. Thus, the transistor Q3 is turned on, allowing a field electric current to flow from the battery 5 to the field coil 102. As a result, the AC generator 1 is brought to a state where the AC generator 1 is able to generate electric power.

When the engine is started and thus the AC generator starts generating the electric power, the voltage at the positive output terminal 201 of the rectifier 2 is raised. Thus, the battery 5 is electrically charged to increase its voltage. A transistor 401 of the external control unit 4 usually generates a high-level signal, so the transistor Q1a of the voltage regulator 3-2 is brought to a conductive state and the voltage dividing resistor 303 is short-circuited.

The voltage across the positive and negative terminals of the battery 5 has been detected on the basis of the divided voltage $V_A$ generated by the voltage dividing resistors 301 and 302. When the battery voltage has been raised to increase the divided voltage provided by the voltage dividing resistors 301 and 302 above the breakdown voltage for the Zener diode ZD1, the Zener diode ZD1 is rendered electrically conductive to allow a current to flow into the base of the transistor Q2, thus turning it on.

When the voltage of the battery 5 has become lower than a predetermined level to reduce the divided voltage below the breakdown voltage, the Zener diode ZD1 is rendered non-conductive and the transistor Q2a is turned off. Thus, the transistor Q3 is turned on or off in accordance with whether the transistor Q2 is turned on or off. As a result, the field electric current flowing through the field coil 102 is repeatedly turned on and off so that the output power of the AC generator 1 is controlled to the normal level. As a result, the voltage to be charged to the battery 5 can be set to the usual level.

When the transistor 401 with the transistor Q1a being turned on generates a low-level signal in response to an signal input from any of a variety of sensors for detecting the state of driving or operation of the automobile, the transistor Q1 I of the voltage regulator 3-2 is turned off and thus the voltage dividing resistor 303 is rendered into serial connection to the voltage dividing resistor 302. As a result, the voltage of the battery 5 is detected by the voltage dividing resistors 302, 303 and 304. Since the voltage of the battery 5 is set to the level lower than the usual level, the voltage to be charged to the battery 5 is set to the level lower than the usual level.

The apparatus shown in FIG. 19 is constructed such that the voltage of the battery 5 is supplied from its positive terminal to an end of the serially connected voltage dividing resistors through a lead wire so as to detect the charged voltage of the battery. However, if the lead wire is disconnected due to an accident or the like, charging of the battery 5 would sometimes be uncontrollable, causing over-charging.

An apparatus equipped with a circuit for preventing over-charging of a battery due to such an accidental disconnection of a lead wire is also known to the inventors of the subject application.

FIG. 20 is a diagram illustrating the arrangement of such an apparatus. In this figure, in addition to the components shown in FIG. 19, a voltage regulator 3-3 of this apparatus includes a circuit for preventing over-charging of a battery which comprises: voltage dividing resistors 305 and 306 series connected in series between the positive terminal of the battery 5 and ground through the key switch 8 and a indicator lamp 9 series connected thereto; and a diode D3 having an anode thereof connected to a connection point between the voltage dividing resistors 305 and 306 and a cathode thereof connected to the cathode of the Zener diode ZD1. The resistance values of the voltage dividing resistors 305 and 306 are set such that when the voltage to be charged to the battery 5 has been raised to about 15.6 V, the breakdown voltage for the Zener diode ZD1 is developed at the connection point between the voltage dividing resistors 305 and 306 through the diode D3. A rectifier 2A has a sub-terminal 202 of a rectifier for supplying an field electric current to the field coil 102 at the time of an initial power generation stage of the AC generator 1.

The operation of the apparatus shown in FIG. 20 will now be described. When the key switch 8 is turned on, an electric current flows from the battery 5 to the base of the transistor Q3 through the resistor 304 so that the transistor Q3 is thereby turned on. As a result, the field electric current is supplied to the field coil 102 to thereby turn on the indicator lamp 9.

When the engine has been started and the AC generator 1 starts generating electric power, the voltage at the sub-terminal 203 increases to substantially the same level as the voltage of the battery 5, thus turning off the indicator lamp 9. At this time, the charging electric current flows from the positive terminal 201 of the rectifier 201 to the battery 5 so that the battery 5 is electrically charged. Furthermore, electric power is also supplied from the rectifier 201 to the load 6 through the load switch 7.

Since the transistor 401 of the external control unit 4 is in a non-conductive state, the transistor Q1 is in a conductive state because an electric current is being supplied to the base of the transistor Q1 from the sub-terminal 203 through the resistor 300. Therefore, the divided voltage $V_A$ for the battery voltage is determined on the basis of the resistance ratio of the resistors 301 and 302.

When the divided voltage $V_A$ has been determined as described above, an offset voltage, which is determined on the basis of the divided voltage $V_A$, is supplied to the cathode of the Zener diode ZD1 through the diode D3. As the AC generator 1 starts power generation, the charging voltage or output voltage of the AC generator 1 is increasing to raise the potential of the voltage detection terminal (i.e., positive terminal) of the battery 5 to, for example, about 14.4 V as shown in FIG. 21. At the same time, the divided voltage $V_A$ is increased to reach the breakdown voltage for the Zener diode ZD1.

As a result, the Zener diode ZD is rendered electrically conductive, turning on the transistor Q2 and turning off the ensuing transistor Q3. Thus, the field electric current supplied to the field coil 102 is interrupted. The interruption of the field electric current stops power generation of the AC generator 1, thus preventing over-charging of the battery 5. Thereafter, when the voltage of the battery 5 decreases below a predetermined level such as 14.4 V, the transistor Q2 is turned off and the transistor Q3 is turned on, whereby the AC generator 1 resumes power generation again to start charging of the battery 5.

In a case where no electric load for the battery 5 is required and the voltage of the AC generator 1 is intended to be adjusted to about 12.8 V, the transistor 401 of the external control unit 4 is rendered conductive to turn the transistor Q1 off. As a result, the voltage dividing resistor 303 is connected in series to the voltage dividing resistor 302 so that the voltage dividing ratio of the battery voltage is increased. Accordingly, the offset voltage with respect to the Zener diode ZD1 is raised, thus increasing the output power of the AC generator 1. When the voltage to be charged to the battery 5 is thus raised to about 12.8 V, the Zener diode ZD1 is rendered electrically conductive. As a result, the transistor Q2 is turned on and hence the ensuing transistor Q3 is turned off to interrupt the field current, so the AC generator 1 ceases power generation, thus adjusting the generator output power to 12.8 V. By repeatedly turning the output of the transistor 401 of the external control unit 4 on and off as described above, the voltage to be charged to the battery 5 can be adjusted to 12.8 V or 14.4 V as shown in FIG. 21.

The foregoing apparatuses constructed as described above have the following disadvantages.

First, with the first-mentioned apparatus shown in FIG. 18, both the voltage regulator 3-1 and the rectifier 201 are generally incorporated in or integrally formed with the AC generator 1 due to the necessity of eliminating the influence of a voltage drop in the grounding circuit on the adjustment voltage for the AC generator 1. Therefore, two lead lines are required which extend from the respective bases of the transistors Q1 and Q4 in the voltage regulator 3-1 for connection with the external control unit 4 in order to supply control signals from the external control unit 4 to the voltage regulator 3-1. Accordingly, two terminals for connection of the two lead lines are required as well. Thus, reliability in connection of the two lead lines to the terminals is required, complicating wiring operation and hence increasing the overall cost of manufacture of the apparatus.

Another problem arises with the second-mentioned apparatus shown in FIG. 19 in that the generator output voltage can be adjusted to only two levels consisting of a usual level and a low level lower than the usual level in dependence on whether the level of the control signal supplied from the external control unit 4 to the voltage regulator 3-2 is high or low and, therefore, the output voltage of the AC generator 1 cannot be adjusted finely so as to correspond exactly to the state of driving or operation of the automobile.

Moreover, with the last-mentioned apparatus shown in FIG. 20, the adjustment or target voltage for the AC generator 1 can be switched over from a usual level of 14.4 V to a low level of 12.8 V when no electric load is required or connected, so that the load of the AC generator 1 acting on the engine is reduced, thus improving fuel consumption. In this case, however, the rapid switching of the adjustment or target voltage from the usual level of 14.4 V to the low level of 12.8 V abruptly reduces the output voltage of the AC generator 1. Due to the resultant abrupt reduction in the load of the AC generator 1 acting on the engine, there arises a further problem in that the rotational speed of the engine increases abruptly.

On the other hand, when the adjustment or target voltage is restored from 12.8 V to 14.4 V to meet the requirement for increased power generation, the adjustment or target voltage is rapidly switched over as well, so that the engine torque required for driving the AC generator 1 is also rapidly increased. Thus, the load of the AC generator 1 acting on the engine abruptly increases accordingly, giving rise to a problem that the rotational speed of the engine is abruptly reduced. This results in unstable operation of the engine.

SUMMARY OF THE INVENTION

The present invention is intended to overcome the foregoing problems encountered with the aforementioned apparatuses.

An object of the present invention is to provide an apparatus for controlling an output of a vehicular AC generator for a vehicle in which wiring from a control unit to a voltage regulator can be carried out in a simple and easy manner by using only one lead line, thus enhancing wiring efficiency and reducing the cost of manufacture.

Another object of the present invention is to provide an apparatus for controlling an output of a vehicular AC generator for a vehicle which allows smooth adjustment of an output voltage of an AC generator from a usual level to another level or vice versa in accordance with the level (the duty ratio) of a control signal (a duty signal or the like) supplied from a control unit to a voltage regulator, without adversely affecting engine operation.

A further object of the present invention is to provide an apparatus for controlling an output of a vehicular AC generator for a vehicle which is capable of linearly controlling the output power of the AC generator in accordance with a change in the level of a control signal from a control unit so as to finely adjust the generator output power to an desired value.

According to the present invention, there is provided an apparatus for controlling an output of a vehicular AC generator which has a field coil and which is connected to a battery for charging thereof, the apparatus comprising: sensor means for sensing an operating condition of a vehicle on which the AC generator is installed and generating a corresponding output signal; a control unit connected to the battery and the sensor means for generating a control signal which has a duty ratio corresponding to the sensed operating condition of the vehicle; and a voltage regulator connected to the battery and the control unit for detecting an output voltage of the battery and controlling turning on/off of a field current supplied from the battery to the field coil in accordance with the detected battery voltage so as to adjust an output voltage of the AC generator to a level that is determined in accordance with the duty ratio of the control signal supplied from the control unit to the voltage regulator.

Since the adjustment voltage for the AC generator is set in accordance with the duty ratio of the control signal supplied from the control unit corresponding to the driving state of the vehicle, a variety of information for the adjustment voltage can be supplied from the control unit through a single signal line. Therefore, the wiring can be simplified and the reliability of the apparatus can be improved.

In a preferred form of the invention, the voltage regulator comprises a duty ratio determination circuit that determines the duty ratio of the control signal and, in accordance with a result of the determination, sets the output voltage of the AC generator to an adjustment value.

In another preferred form of the invention, the control unit generates a control signal which optimizes the output voltage of the AC generator so as to suit to the sensed operating condition of the vehicle, and the voltage regulator comprises a setting circuit for setting the output voltage of the AC generator to a value corresponding to the control signal.

By specifying the information for the adjustment voltage based on which the level of the control signal from the control unit is determined so as to set the adjustment voltage to a predetermined value, the output voltage from the AC generator can be adjusted in a wide range.

In a further preferred form of the invention, the duty determination circuit converts the duty ratio of the control signal to a corresponding voltage which is compared with a reference voltage by the voltage regulator.

By converting the duty ratio of the control signal to a corresponding voltage and by switching the adjustment voltage for the AC generator in accordance with a deviation of the converted voltage from the reference voltage to be set, the adjustment voltage can be arbitrarily changed by setting the reference voltage to a desired value. Therefore, switching and setting of the adjustment voltage can be performed easily.

In a further preferred form of the invention, the setting circuit comprises a voltage dividing circuit having a plurality of resistors connected in series with each other between a power supply and ground so as to adjust a divided ratio of a voltage with which the control signal from the control unit is compared to thereby change the output voltage of the AC generator.

Thus, the adjustment value can easily be switched only by switching over the resistance values of the serially connected resistors of the voltage dividing circuit.

In a further preferred form of the invention, the voltage regulator comprises: signal level determination means for determining whether the level of the control signal supplied from the control unit to the voltage regulator is a first level which is lower than a first predetermined level, or a second level which is higher than a second predetermined level, or a third level which is between the first and second predetermined levels; and switch means for switching over the output voltage of the AC generator between at least two levels in accordance with the determination of the signal level determination means. Thus, the adjustment voltage can easily be controlled from outside through the control unit.

In a further preferred form of the invention, the signal level determination means controls the output voltage of the AC generator to a usual predetermined level when the control signal is of the first level or the second level, and controls, when the control signal is of the third level, the output voltage of the AC generator to a variable level which varies in accordance with a change in the level of the control signal. Thus, the adjustment voltage for the AC generator can be set finely.

In a further preferred form of the invention, the signal level determination means controls the output voltage of the AC generator to a first usual predetermined level when the control signal is of the first level, controls the output voltage of the AC generator to a second usual predetermined level when the control signal is of the second level, and controls, when the control signal is of the third level, the output voltage of the AC generator to a variable level which varies in accordance with a change in the level of the control signal. With this arrangement, the adjustment voltage can be set finely.

In a further preferred form of the invention, the control signal supplied from the control unit is in the form of a frequency signal of a variable frequency, the voltage regulator further comprising converting means for converting the frequency signal into a corresponding voltage. With this arrangement, an influence of noise on the control signal can be reduced by increasing the frequency of the control signal.

In a further preferred form of the invention, the voltage regulator switches the adjustment voltage for the AC generator into at least four stages in accordance with the level of the control signal supplied from the control unit to the voltage regulator.

In a further preferred form of the invention, the level of the control signal is determined so as to switch a reference voltage for the voltage regulator into a plurality of stages corresponding in number to the stages of the output voltage of the AC generator.

By converting the duty ratio of the control signal to a corresponding voltage and by switching the adjustment voltage in accordance with the deviation between the converted voltage and a reference voltage to be set, the adjustment voltage can be as well as arbitrarily set by setting the reference voltage. Therefore, switching and setting of the adjustment voltage can be performed easily.

In a further preferred form of the invention, the apparatus further comprises a plurality of detection means for detecting the level of the control signal, and logic determination means for determining a logic of the control signal detected by the detection means so as to change the level of the reference signal in accordance with a result of the determination.

In a further preferred form of the invention, the voltage regulator further comprises determining means for determining an upper limit value and a lower limit value for the output voltage of the AC generator, switching means for switching over the output voltage of the AC generator between the upper limit value and the lower limit value determined by the determining means, and smoothing means for smoothing the switching-over between the switched upper limit value and lower limit value, wherein the adjustment voltage for the AC generator is linearly controlled in response to the control signal from the control unit. Thus, the adjustment voltage can be linearly varied by controlling the frequency of the control signal. This can be done with only a simple structure.

In a further preferred form of the invention, the control unit generates a control signal, the duty ratio of which is determined in accordance with whether the vehicle is driven in an idle driving mode in which the engine of the vehicle is idling with the AC generator being connected to no electric load, or in a constant electric load driving mode in which the AC generator is electrically connected to a constant electric load, or in a high electric load driving mode in which the AC generator is electrically connected to a high electric load.

The above objects, features and advantages of the present invention will be more clearly understood from the following detailed description of preferred embodiments of the invention taken in conjunction with the accompanying drawings.

DESCRIPTION OF THE PREFERRED EMBODIMENTS

Figure 18:
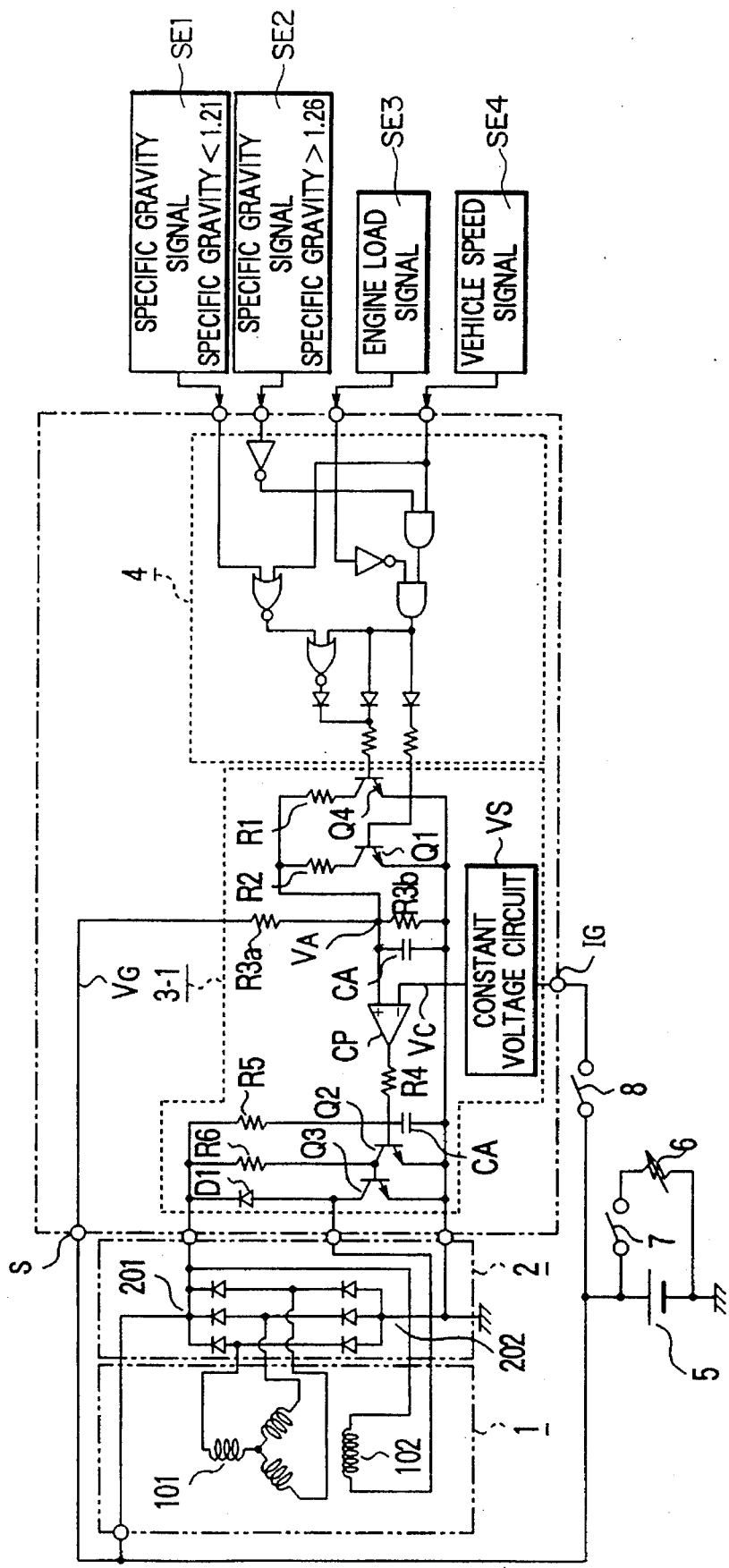
FIG. 18 is a diagram which illustrates the structure of a conventional apparatus for controlling an output of an AC generator for a vehicle.
Figure 19:
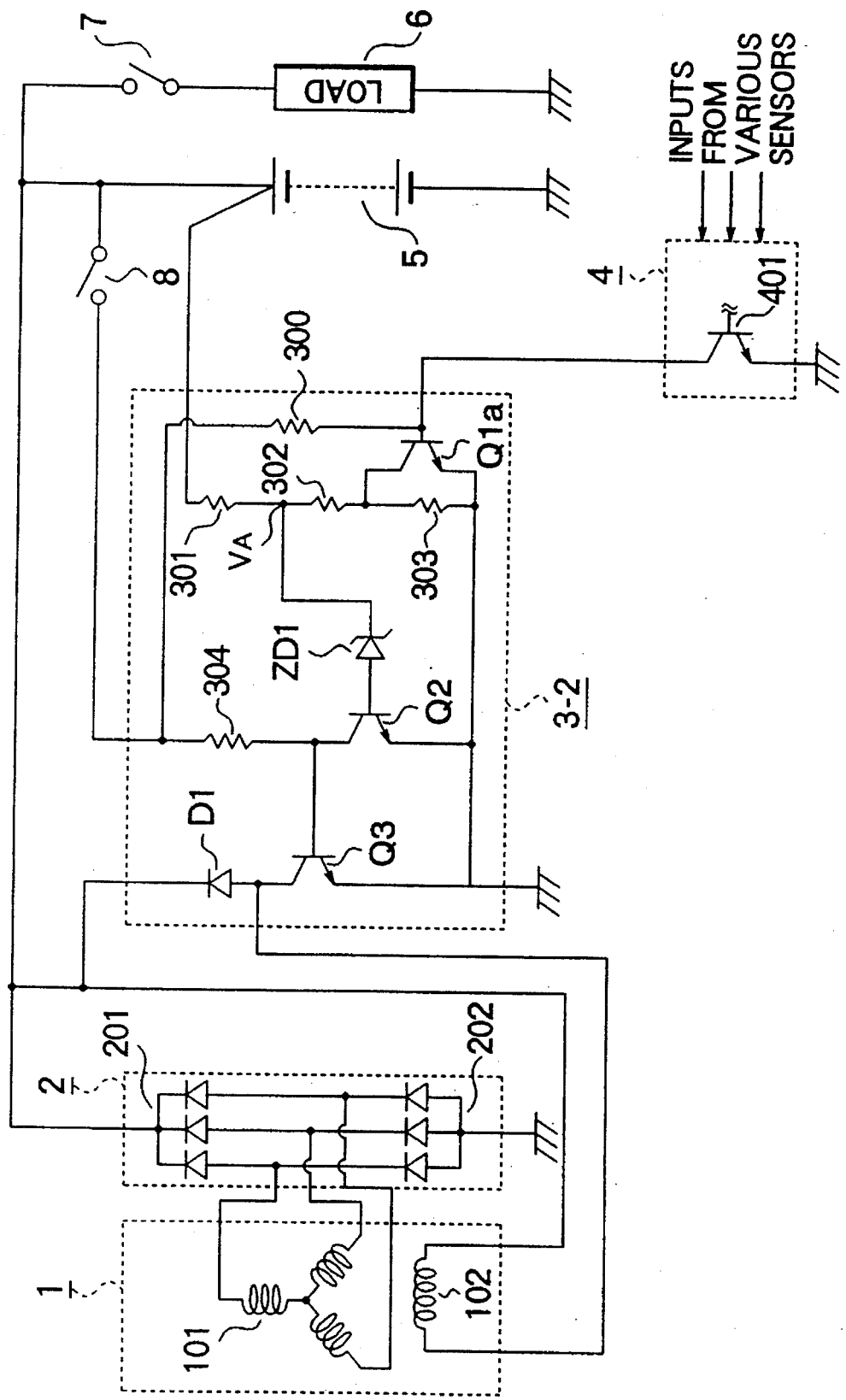
FIG. 19 is a diagram which illustrates the structure of an apparatus for controlling an output of an AC generator for a vehicle which is known to the inventors of the present invention.
Figure 20:
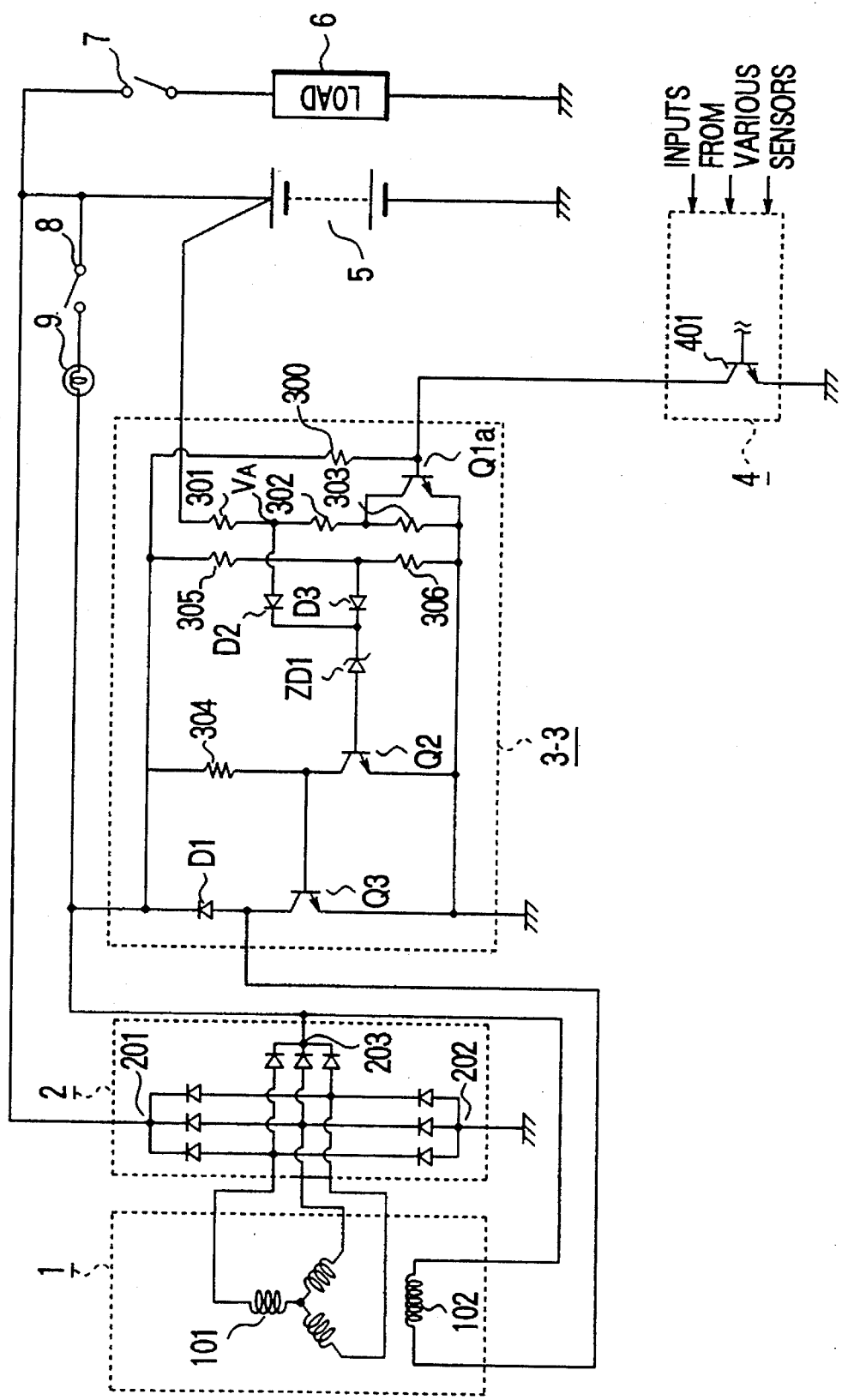
FIG. 20 is a diagram which illustrates the structure of an apparatus for controlling an output of an AC generator for a vehicle which is also known to the inventors of the present invention.
Figure 21:
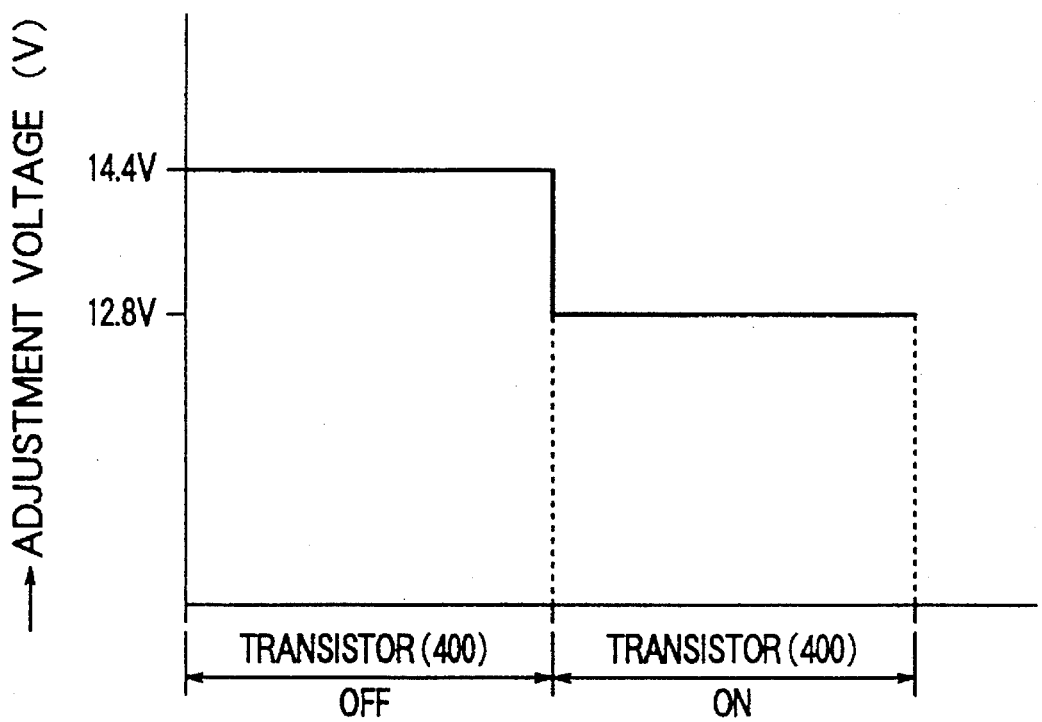
FIG. 21 is a characteristic graph showing the adjustment voltage of the AC generator which is known to the inventors of the present invention.

Preferred embodiments of the present invention will now be described with reference to the drawings. Referring to the drawings, the same reference numerals as those shown in FIGS. 18 to 20 represent the same or corresponding elements.

First Embodiment

Figure 1:
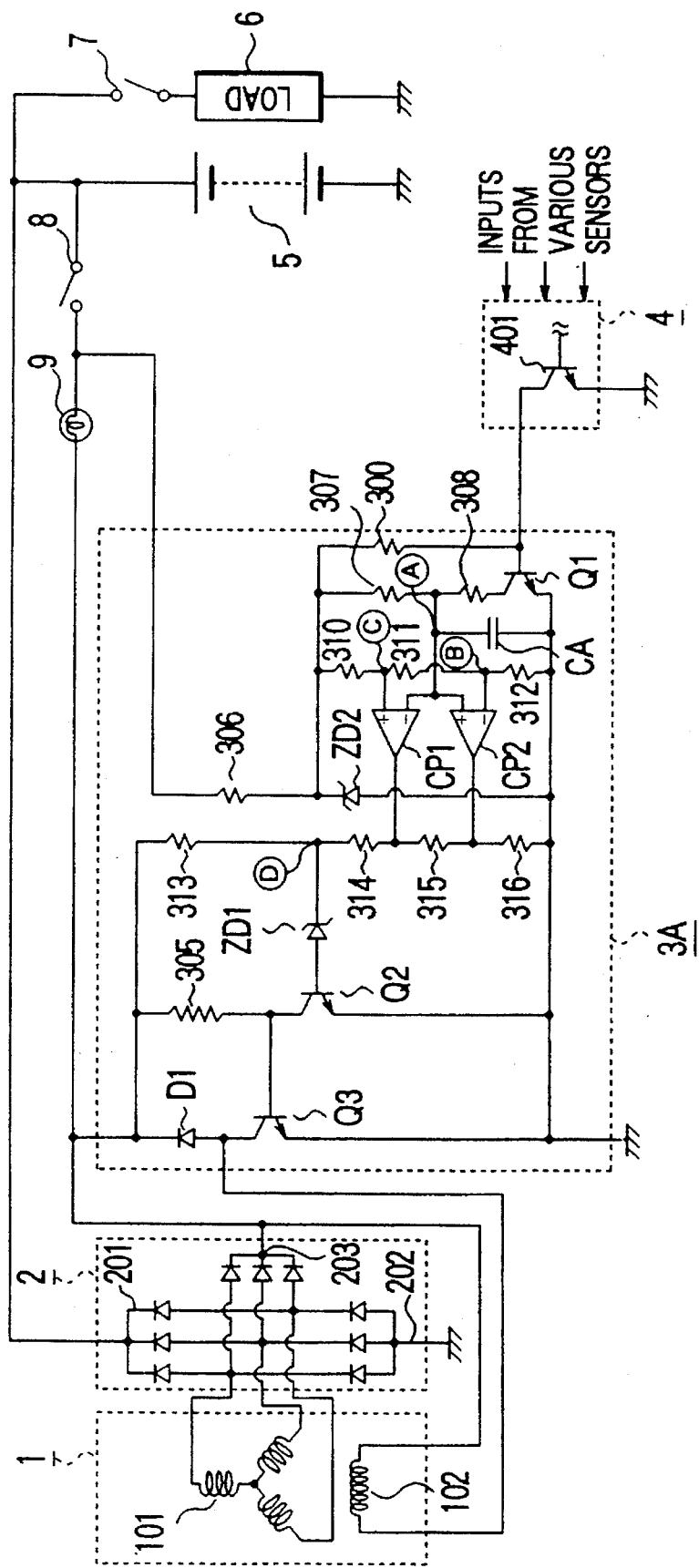
FIG. 1 is a diagram which illustrates the structure of an apparatus for controlling an output of an AC generator for a vehicle according to a first embodiment of the present invention.

FIG. 1 illustrates an apparatus for controlling an output from an AC generator for a vehicle according to a first embodiment of the present invention. Referring to FIG. 1, a voltage regulator 3A includes a transistor Q1 which serves as a duty determination circuit for repeatedly turning on and off power generation of an AC generator 1 in response to a duty signal transmitted from a transistor 401 of a control unit 4 to thereby adjust the duty ratio from 0% to 100%. The voltage regulator 3A further includes an operational resistor 306 of the Zener diode ZD2, an end of the operational resistor 306 being connected to a cathode of the Zener diode ZD2 whose anode is grounded, another end of the operational resistor 306 being connected to the positive terminal of a battery 5 through a key switch 8; a charging resistor 307 whose an end is connected to a connection point between the Zener diode ZD2 and the operational resistor 306 and whose another end is connected to the collector of the transistor Q1 through a discharging resistor 308; and a capacitor CA whose an end is connected to a connection point between the charging resistor 307 and the discharging resistor 308 and whose another end is, together with the emitter of the transistor Q1, grounded. Here, it is to be noted that the control unit 4 detects an idling operation, a constant electric load operation, a high electric load operation of an internal combustion engine of a vehicle such as an automobile by means of a variety of sensors (not shown) such as SE1 to SE4 shown in FIG. 18, and generates a duty signal indicating a duty ratio corresponding to the detected driving or operating state of the vehicle.

The capacitor CA discharges electric power through the discharging resistor 308 when the transistor Q1 is turned on. When the transistor Q1 is turned off, the capacitor CA is electrically charged through the charging resistor 307. The charging and discharging voltages appear at point A. It is to be noted that the Zener diode ZD2 is a constant-voltage device for making the voltage of the battery 5 to be a constant value such as, for example, 7 V.

The voltage regulator 3A further includes an adjusted-voltage setting circuit that compares the voltage (the charging voltage) at point A of the capacitor CA, which serves as a reference voltage, with the output voltage of the AC generator 1 so as to set an adjustment or target voltage for the AC generator 1. The adjusted-voltage setting circuit comprises a plurality of voltage dividing resistors 310 to 312 for dividing the constant voltage obtained by the Zener diode ZD2 to generate two levels of the divided voltages at points B and C.

Furthermore, the voltage regulator 3A further includes an adjusted-voltage switching circuit comprising a comparator CP1 whose positive input terminal receives the divided voltage at point C and whose negative input terminal receives the voltage at point A; a comparator CP2 whose positive input terminal receives the divided voltage at point A and whose negative input terminal receives the divided voltage at point B; and a plurality of voltage dividing resistors 313 to 316 connected in series between a sub-terminal 203 of rectifier 2 and ground.

The cathode of the Zener diode ZD1 is connected to the connection point between the voltage dividing resistors 313 and 314, the output terminal of the comparator CP1 is connected to the connection point between the voltage dividing resistors 314 and 315, the output terminal of the comparator CP2 is connected to the connection point between the voltage dividing resistors 315 and 316. In accordance with the outputs representing the results of comparisons performed by the comparators CP1 and CP2, each of the voltage dividing resistors 314 and 315 is controlled to be short-circuited so that the divided voltage of the Zener diode ZD1 is changed.

The operation will now be described. When the key switch 8 has been closed, the engine starts so that the AC generator 1 starts generating electric power, similar to the afore-mentioned apparatus of FIG. 18, thus increasing the output voltage thereof at the sub-terminal 203. When the voltages at the opposite terminals of the indicator lamp 9 have been made to be the same, the indicator lamp 9 is turned off and normal generation of electric power is displayed. When the output voltage of the AC generator 1 has been further increased, the output voltage at the sub-terminal 203 increases. Therefore, the Zener diode ZD1 is electrically conducted with the divided voltage at point D developed by the voltage dividing resistors 313 to 316 so that the transistor Q2 is turned on.

As a result, the ensuing transistor Q3 is turned off and thus the field coil loop is interrupted, reducing the field electric current supplied to the field coil 102 of the AC generator 1. The reduction in the field electric current decreases the output voltage of the AC generator 1 so that the voltage to be charged to the battery 5 is adjusted to the value determined by the set value of the divided voltage. That is, the output voltage of the AC generator 1 is, in a usual state, adjusted to the value determined by the divided voltage ratio of the voltage dividing resistors 313 to 316.

During control of the adjustment or target voltage for the AC generator 1 in accordance with the divided voltage determined by the voltage dividing resistors 313 to 316 as described above, the control unit 4 detects the driving or operating state of the vehicle by means of a variety of sensors and turns on the transistor 401 to send to the voltage regulator 3A a signal (hereinafter called a "duty signal")for changing the duty ratio from 0% to 100% in order to specify the generator adjustment or target voltage corresponding to the detected driving or operating state of the vehicle.

The transistor Q1, which receives the duty signal, is repeatedly turned on and off at a cycle corresponding to the duty ratio so as to cause the charging electric current to flow into the capacitor CA through the charging resistor 307 when the transistor Q1 is turned off. When the transistor Q1 is turned on, the thus charged voltage of the battery 5 is discharged through the discharging resistor 308 and the now conductive transistor Q1. The capacitor CA repeats charging and discharging as described above so that the voltage at point A is made to be a level proportional to the duty ratio of the control signal from the control unit 4.

The voltage dividing resistors 310, 311 and 312 divide the generator output voltage stabilized by the Zener diode ZD2 to make a divided voltage at the connection point between the voltage dividing resistors 310 and 311 and a divided voltage at the connection point between the voltage dividing resistors 311 and 312 to be the reference voltages for the comparators CP1 and CP2, respectively. The comparator CP1 makes a comparison between the voltage at point A and the voltage at point C which are changed in accordance with the duty ratio, whereas the comparator CP2 makes a comparison between the voltage at point A and the voltage at point B.

When the output voltage of the AC generator 1 is adjusted to the usual level (for example, 14.4 V)in response to the duty signal from the control unit 4 and in accordance with the outputs from the comparators CP1 and CP2, the duty ratio is made to be about 27.3% and the transistor Q1 is turned on and off to electrically charge the capacitor CA. Thus, the relationship that the voltage at point A is less than the voltage at point B is held so that the output of the comparator CP1 is raised to a high level and the output of the comparator CP2 is lowered to a low level. Thus, the voltage dividing resistor 316 is short-circuited. As a result, the divided voltage at point D, which is determined on the basis of the resistance values of the voltage dividing resistors 313 to 315, is set to a value with which the Zener diode ZD1 is rendered electrically conductive when the generator output voltage is made to the usual level (for example, 14.4 V).

When the generator output voltage is adjusted to a level (for example, 12.8 V) which is lower than the usual level, the duty ratio is made to be about 100% whereby the transistor Q1 is turned off to charge the capacitor CA through the charging resistor 307. Thus, the relationship is established that the voltage at point B is less than the voltage at point A which is less than the voltage at point C, changing the output level of the comparator CP1 to a high level, and the output level of the comparator CP2 to a high level as well. As a result, the voltage dividing resistors 313 to 316 are enabled so that the divided voltage at the point D, which is determined in accordance with the values of the voltage dividing resistors 313 to 316, is set to a value with which the Zener diode ZD1 is electrically conducted when the voltage of generated electric power has become a level (for example, 12.8 V)lower than the usual level.

When the generator output voltage is adjusted to a level (for example, 15.0 V) higher than the usual level, the duty ratio is made to be about 0% whereby the transistor Q1 is turned on, and the capacitor CA is discharged through the discharging resistor 308. Thus, the relationship is established that the voltage at the point C is less than the voltage at point A, changing the output level of the comparator CP1 to a low level and the output level of the comparator CP2 to a high level. As a result, the voltage dividing resistors 315 to 316 are short-circuited so that the divided voltage at point D, which is determined on the basis of the values of the voltage dividing resistors 313 and 314, is set to a value with which the Zener diode ZD1 is rendered electrically conductive when the generator output voltage has become a level (for example, 15.0 V) higher than the usual level. Therefore, the signal capable of setting the adjustment or target voltage for the AC generator 1 to three steps can be transmitted from the control unit 4 to the voltage regulator 3A by using only one transmission line.

Here, it is to be noted that the control unit 4 is generally installed in the interior of a passenger compartment of an automobile while the AC generator 1 incorporated in the voltage regulator 3A is installed in an engine room. Therefore, the control unit 4, the AC generator 1 and the voltage regulator 3A have different ground potentials, thus affecting control of the voltage regulator 3A through the control unit 4. Since this embodiment is constructed such that the duty signal transmitted from the control unit 4 to the voltage regulator 3A is directly supplied to the base of the transistor Q1, the risk of the above influence can be eliminated.

Second Embodiment

Although the first embodiment is constructed such that the adjustment or target voltage for the AC generator 1 is set to three levels including a first or low level lower than the usual level, a second or intermediate level corresponding to the usual level, and a third or high level higher than the usual level, the generator output voltage may be set from the first or low level to the third or high level in a linear manner so as to finely control the output voltage of the AC generator 1.

Figure 2:
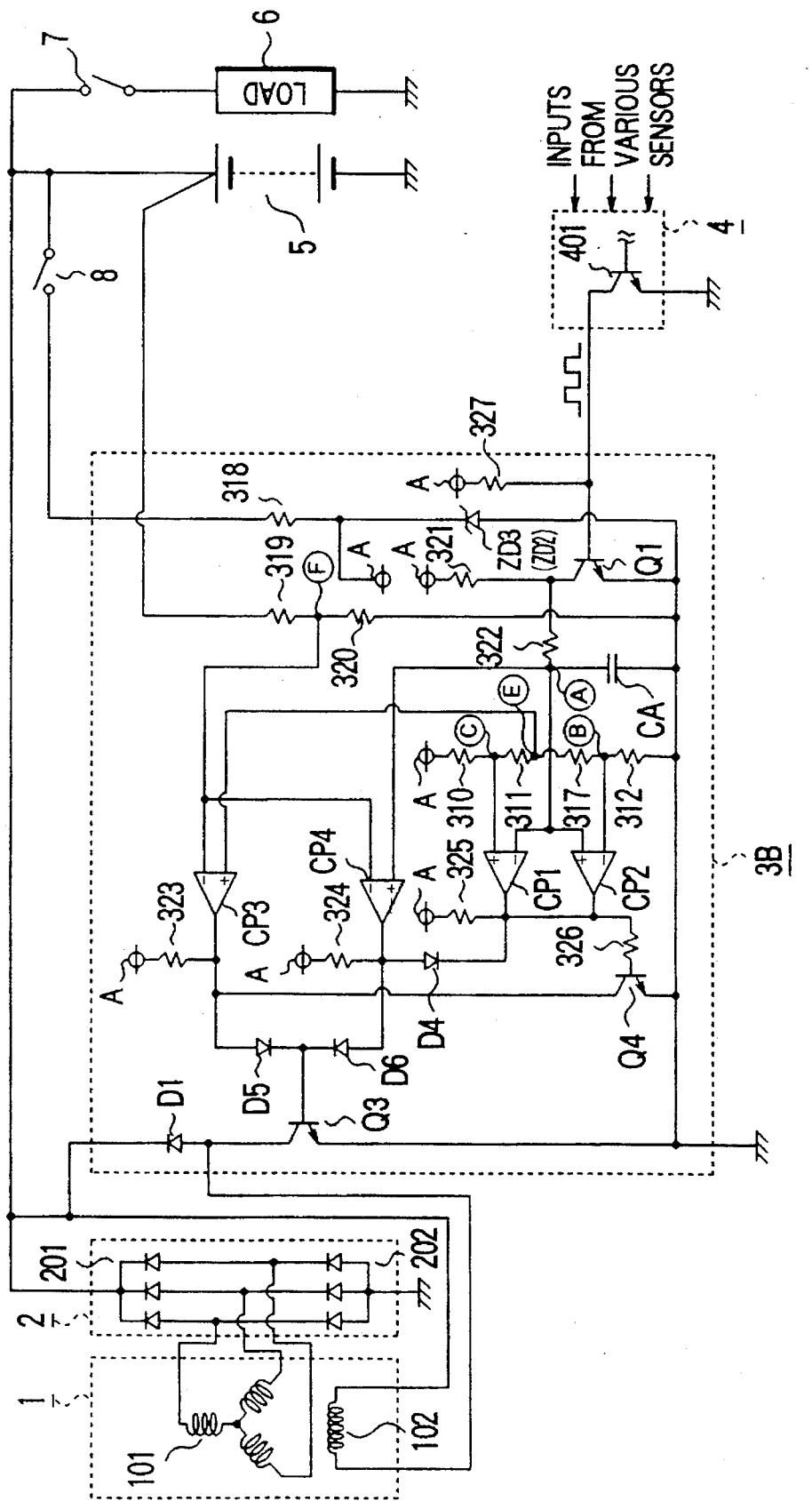
FIG. 2 is a diagram which illustrates the structure of an apparatus for controlling an output of an AC generator for a vehicle according to a second embodiment of the present invention.
Figure 3:
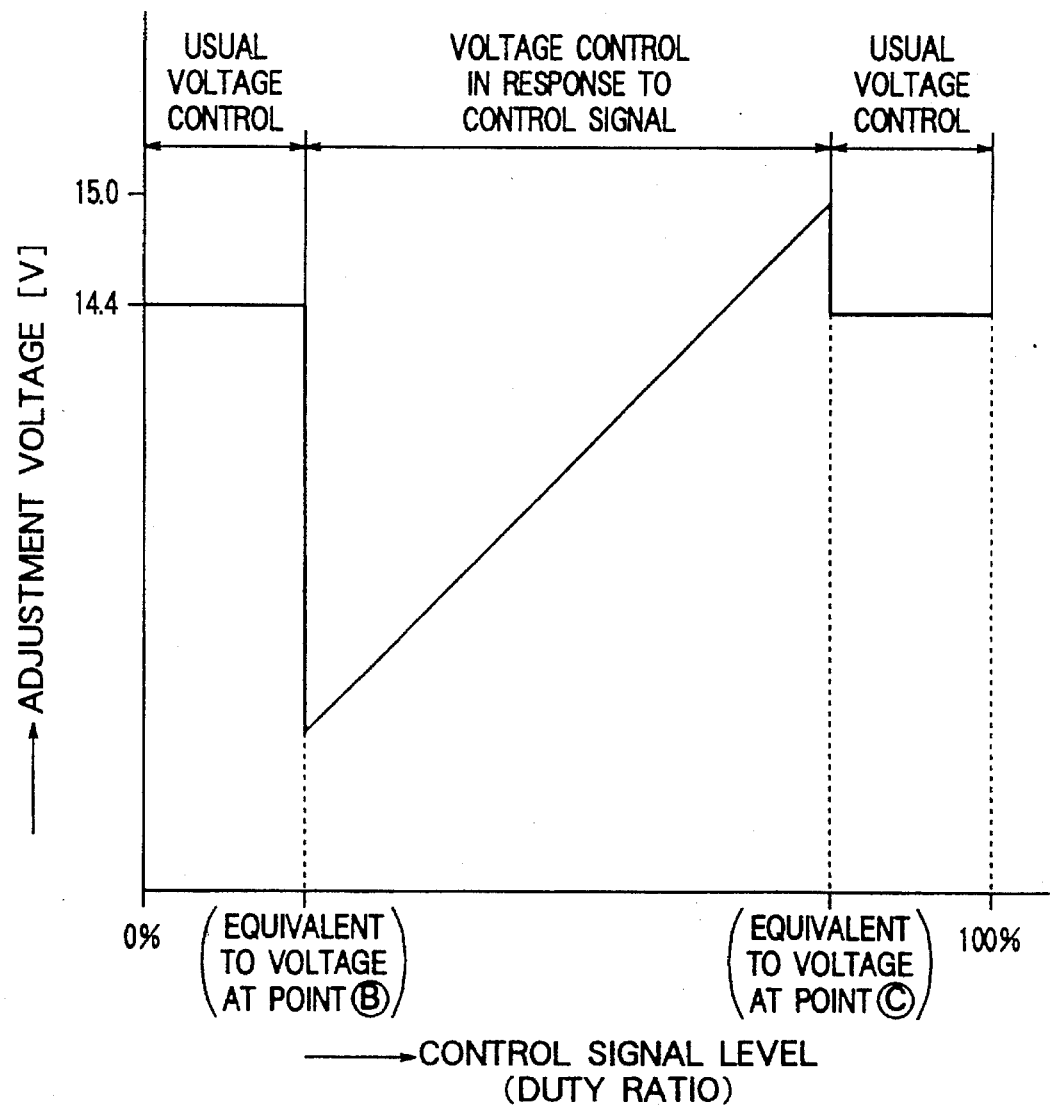
FIG. 3 is a characteristic graph showing the adjustment voltage of the AC generator according the first and second embodiments.

FIG. 2 illustrates a second embodiment of the present invention having the above function. In this Figure, the same reference numerals as those shown in FIG. 1 represent the same or corresponding elements. In FIG. 2, a voltage regulator 3B of this embodiment includes an operational resistor 18, a Zener diode ZD3, a base resistor 327, a charging resistor 321 and a discharging resistor 322, all of which correspond respectively to the operational resistor 306, the Zener diode ZD2, the base resistor 300, the charging resistor 307 and the discharging resistor 308 of the voltage regulator 3A shown in FIG. 1.

The voltage regulator 3B, in addition to the above components corresponding to those of the voltage regulator 3A, further includes: a plurality of voltage dividing resistors 319 and 320 connected in series between the voltage detection terminal of the battery 5 and ground; a voltage dividing resistor 317 connected in series to the voltage dividing resistors 310 to 312 for setting reference voltages for the comparators CP1 and CP2; and a comparator CP3 for comparing the voltage at point F, which is changed in accordance with the generator output voltage, with a reference voltage at point F that is determined on the basis of the values of the voltage dividing resistors 310 to 312 and 317 to thereby control the adjustment or target voltage for the AC generator 1, the comparator CP3 being adapted to generate a low level signal to the transistor Q3 through the diode D5 when the voltage at point F is greater than the voltage at point E so as to turn off the transistor Q3. The voltage regulator 3B further includes a comparator CP4 for controlling the adjustment or target voltage in response to an external control signal from the control unit 4, the comparator CP4 being operable to make a comparison between the voltage at point F and the voltage at point A that is set and updated in accordance with the duty ratio of the duty signal. If the voltage at point F is higher than the voltage at point A, the comparator CP4 generates a low level signal to the transistor Q3 through the diode D6 to turn off the transistor Q3.

The voltage regulator 3B further includes a transistor Q4 that receives a high level signal through the base resistor 326 when the output levels of the comparators CP1 and CP2 are high so as to be turned on to ground, through the emitter thereof, the output of the comparator CP3 connected to the collector thereof; a diode D4 having a cathode connected to the output terminals of the comparators CP1 and CP2, and an anode connected to the output terminals of the comparators CP1 and CP2 which are pulled up in the positive direction, the diode D4 being rendered electrically conductive when the output level of the comparator CP1 or CP2 is high to invalidate the output of the comparator CP4; and a plurality of power-source pull-up resistors 323 to 325 for pulling up the levels of the output terminals of the respective comparators CP1 to CP4 in the positive direction. The operation of this embodiment will now be described. Similar to the first embodiment, the key switch 8 is closed so as to apply the constant voltage of the power source generated by activating the Zener diode ZD3 to each of the power source terminals A. As a result, the divided voltages generated at points C, E and B, at which the voltage dividing resistors 310, 311,317 and 312 are serially connected to each other, serve as reference voltages, which are supplied to the respective comparators CP1 to CP3.

The operations of the comparators CP1 and CP2 will now be described prior to making a detail description of this embodiment. The comparators CP1 and CP2 respectively compare the voltage at point A with the reference voltages at points C and B. That is, when the voltage at point A is less than the voltage at point B, the output of the comparator CP2 is rendered to a low level, and the output of the comparator CP1 to a high level. When the voltage at point B is less than the voltage at point A which is in turn less than the voltage at point C, the output levels of the comparators CP1 and CP2 are rendered high. When the voltage at point B is less than the voltage at point A, the level of the output from the comparator CP1 becomes low and that from the comparator CP2 becomes high.

If the level of the output from the comparator CP1 and/or the level of the output from the comparator CP2 is low, the output from the comparator CP4, whose reference voltage is a voltage collated with or corresponding to the level of the control signal supplied from the control unit 4, is made invalid or disabled. On the other hand, the output from the comparator CP3 for controlling the usual voltage, whose reference voltage is the divided voltages developed by the voltage dividing resistors 310 to 312 and 317, is made valid or enabled. If both of the levels of the outputs from the comparators CP1 and CP2 are high, the transistor Q4 is rendered electrically conductive to disable the output from the comparator CP3 and to enable the output from the comparator CP4.

In the foregoing state of operation, if the duty ratio of the duty signal to be supplied from the control unit 4 to the voltage regulator 3B is set to a range from 0% to a value with which the voltage level at point A is raised to the voltage at point B, which is a first predetermined value, the relationship is established that the voltage at point A is less than the voltage at point B during the period in which the discharging resistor is within the set range. As a result, the level of the output from the comparator CP2 becomes low and the level of the output from the comparator CP1 becomes high.

In a case where the duty ratio of the duty signal is set to a range from a value, with which the voltage at point A is made to the voltage at point C, which is a second predetermined value, to 100%, the relationship is established that the voltage at point C is less than the voltage at point A during the period in which the duty ratio is within the set range. Thus, the level of the output from the comparator CP2 becomes high and the level of the output from the comparator CP1 becomes low.

As a result, the output from the comparator CP4 is disabled, while the output from the comparator CP3 is supplied to the transistor Q3 through the diode D5. In a period in which the generator output voltage does not reach the usual level of 14.4 V but the relationship is established that the voltage at point E is greater than the voltage at point F, the transistor Q3 is turned on so that the field electric current is supplied to the field coil 102 so that the power generating operation of the AC generator 1 is continued to thereby charge the battery 5. When the output voltage of the AC generator 1 has increased to 14.4 V, the level of the output from the comparator CP3 becomes low and the transistor Q3 is turned off. Thus, the field electric current is reduced so that the generator output power is reduced.

In a case where the voltage at point B is less than the voltage at point A which is in turn less than the voltage at point C, both of the levels of the outputs from the comparators CP1 and CP2 become high. Thus, the transistor Q4 is turned on, the output from the comparator CP3 is disabled and the output from the comparator CP4 is supplied to the transistor Q3 through the diode D6. Therefore, when the duty ratio of the duty signal is varied to change the level of the voltage at point C from a level higher than the voltage at point B to the level of the voltage at point C, the voltage at point A corresponding to the duty ratio is supplied to the positive input terminal of the comparator CP4. As a result, the voltage at point F in proportion to the output voltage of the AC generator 1 is supplied to the negative input terminal of the comparator CP4.

When the level of the voltage at point F in proportion to the generator output voltage has reached the level of the voltage at point A which corresponds to the present duty ratio, the comparator CP3 supplies a low level signal to the transistor Q3 which is thereby turned off. If the duty ratio is changed and, thus, the level of the voltage at point A is changed, the comparator CP3 generates a low level signal to the transistor Q3 when the voltage at point F has reached the level of the voltage at point A that corresponds to the changed duty ratio. Therefore, the adjustment voltage of the AC generator 1 can be set to an arbitrary value.

Third Embodiment

Figure 5:
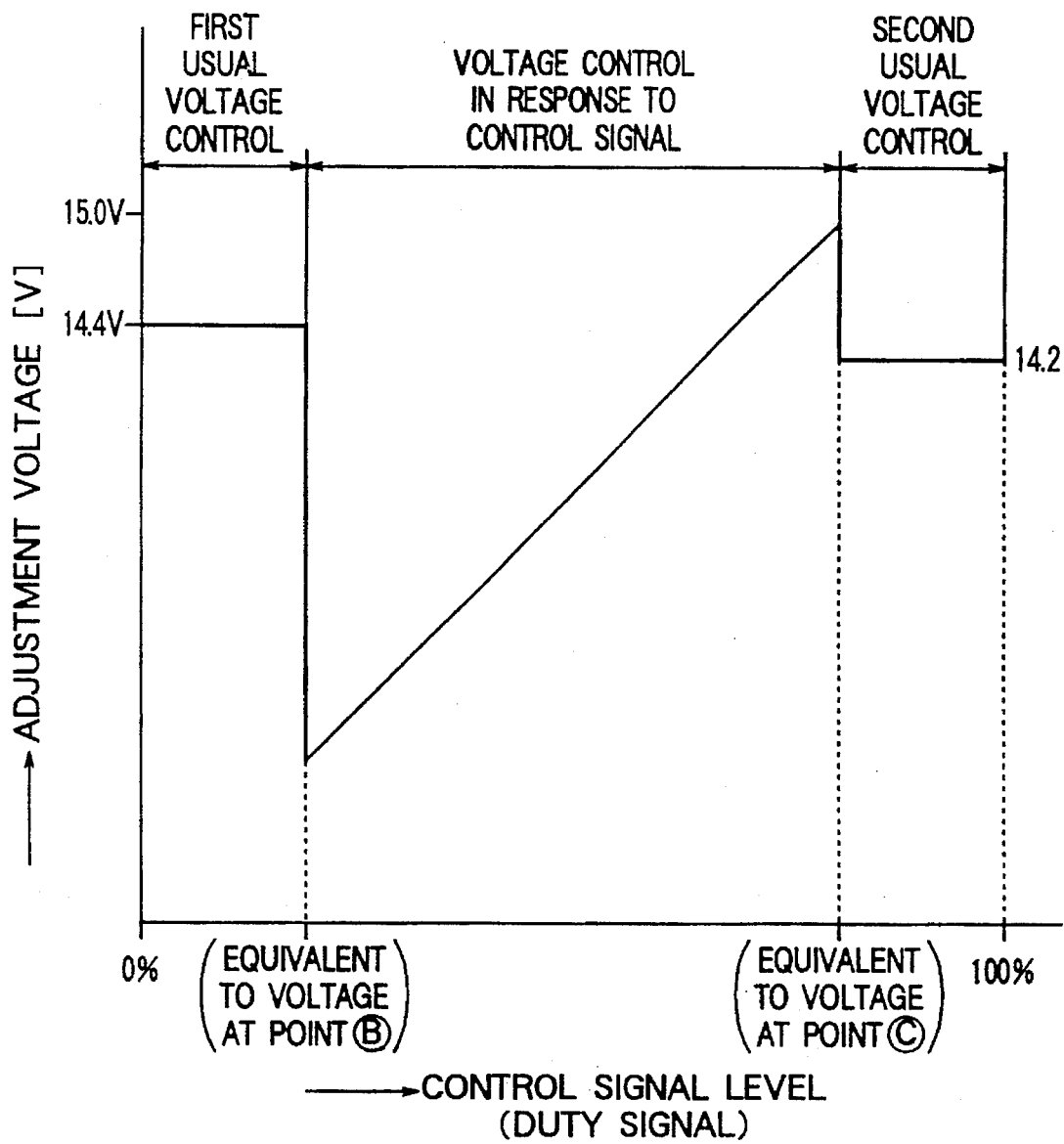
FIG. 5 is a characteristic graph showing the adjustment voltage of the AC generator according the third embodiment.

The above-described second embodiment is constructed such that the output voltage of the AC generator 1 is controlled to the same usual level in cases where the voltage at point A, which is determined in accordance with the duty ratio of the duty signal, is lower than the first predetermined value or higher than the second predetermined value. However, another arrangement as shown in a characteristic graph of the adjustment voltage for the generator output in FIG. 5 may be employed in which a first usual level (about 14.4 V)is realized when the generator output voltage is lower than the first predetermined value, a second usual level (about 14.2 V)is realized when the generator output voltage is higher than the second predetermined value, and the adjustment voltage is arbitrarily set in accordance with the duty ratio when the generator output voltage is between the first predetermined value and the second predetermined value. As a result, the output voltage of the AC generator 1 can be adjusted further finely.

Figure 4:
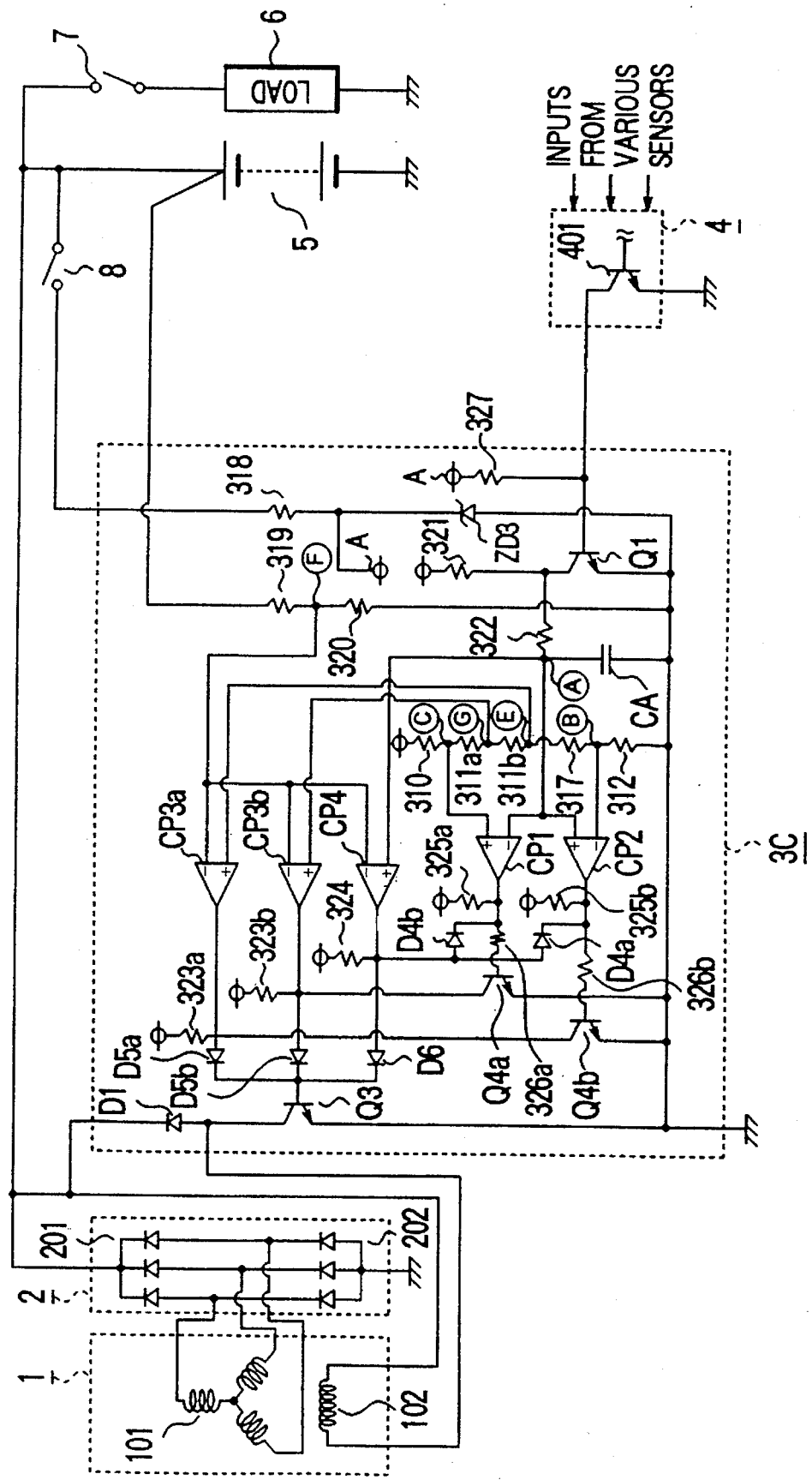
FIG. 4 is a diagram which illustrates the structure of an apparatus for controlling an output of an AC generator for a vehicle according to a third embodiment of the present invention.

FIG. 4 illustrates a third embodiment of the present invention having such a function. In FIG. 4, the same reference numerals as those shown in FIG. 2 represent the same or corresponding elements. In this embodiment, a voltage regulator 3C includes, in addition to the same components of the voltage regulator 3B of FIG. 2, a comparator CP3*a* for controlling a first usual adjustment voltage level; a comparator CP3*b* for controlling a second usual adjustment voltage level; and diodes D5*a* and D5*b* for preventing a reverse current flow, the anodes of which are respectively connected to the output terminals of the comparators CP3*a* and CP3*b*, and the cathodes of which are commonly connected to the base of the transistor Q3. The voltage regulator 3C further includes: a transistor Q4*b*, the collector of which is connected to the output terminal of the comparator CP3*a*, the emitter of which is grounded, and the base of which is connected to the output terminal of the comparator CP2 through the resistor 326*b* so as to ground the output terminal of the comparator CP3*a* when the transistor Q4*b* is turned on; and a transistor Q4*b*, the collector of which is connected to the output terminal of the comparator CP3*b*, the emitter of which is grounded, and the base of which is connected to the output terminal of the comparator CP1 through the resistor 326a so as to ground the output terminal of the comparator CP3b when the transistor Q4b is turned on.

The voltage regulator 3C further includes: diodes D4a and D4b, the anodes of which are commonly connected to the output terminal of the comparator CP4, and the cathodes of which are connected to the output terminals of the comparators CP1 and CP2; voltage dividing resistors 311a and 311b connected in series between the voltage dividing resistors 310 and 317 so as to set reference values for the first and second usual adjustment voltages in accordance with the resistance values thereof; and power-source pull up resistors 325a, 325b, 323a and 323b connected to the output terminals of the comparators CP1, CP2, CP3a and CP3b and each constant-voltage power source terminal A.

The negative input terminals of the comparators CP3a and CP3b are connected to a connection point F between the voltage dividing resistors 319 and 320 for detecting the generated or output voltage of the AC generator 1. On the other hand, the positive input terminals of the comparators CP3a and CP3b are respectively connected to a connection point E between the voltage dividing resistors 311a and 317 for determining the reference value for the first usual voltage level, and to a connection point G between the voltage dividing resistors 311a and 311b for setting the reference value for the second usual voltage level.

The operations of the comparators CP1 and CP2 will now be described prior to making a detailed description of this embodiment. The voltage at point A is compared, by the comparators CP1 and CP2, with the reference voltages at points C and B developed by the voltage dividing resistors 310, 311a, 311b, 317 and 312. That is, when the voltage at point A is less than the voltage at point B, the output of the comparator CP1 is brought to the low level, and the output of the comparator CP2 is brought to the high level. Here, it is to be noted that the set resistance values of the voltage dividing resistors 311a and 311b are respectively used to calculate the divided voltages for determining the first predetermined value for the point G and the second predetermined value for the point E.

When the voltage at point B is less than the voltage at point A which is in turn less than the voltage at point C, the outputs of the comparators CP1 and CP2 are both brought to the high level. When the voltage at point B is less than the voltage at point A, the output of the comparator CP1 is brought to the low level, and the output of the comparator CP2 is brought to the high level. When the level of the output from the comparator CP1 and/or the level of the output from the comparator CP2 is low, the output from the comparator CP4, the reference voltage of which is the voltage at point A collating to or corresponding to the level of the signal supplied from the control unit 4, is disabled.

If at this time the level of the output from the comparator CP1 is high and the level of the output from the comparator CP2 is low, the transistor Q4a is turned on. Thus, the output from the comparator CP3b is disabled whereas the output from the comparator CP3a is enabled. If the level of the output from the comparator CP1 is low and the level of the output from the comparator CP2 is high, the transistor Q4b is turned on. Therefore, the output from the comparator CP3a is disabled and the output from the comparator CP3b is made valid. If the levels of the outputs from the comparators CP1 and CP2 are high, both of the transistors Q4a and Q4b are turned on so that the output terminals of the comparators CP3a and CP3b are grounded through the transistors Q4a and Q4b, thus disabling the outputs of these comparators.

In the foregoing state of operation, if the duty ratio of the duty signal to be supplied from the control unit 4 to the voltage regulator 3C is set to a range from 0% to a value with which the voltage level at point A is raised to the voltage at point B, which is the first predetermined value, the relationship is established that the voltage at point A is less than the voltage at point B during the period in which the duty ratio is within the set range. As a result, the level of the output from the comparator CP2 becomes low and the level of the output from the comparator CP1 becomes high.

Since the outputs from comparators CP3b and CP4 are disabled, the output from the comparator CP3a is supplied to the transistor Q3 through the diode D5a. In a period in which the generated or output voltage of the AC generator 1 does not reach the usual level of 14.4 V and the relationship is established that the voltage at point E is greater than the voltage at point F, the transistor Q3 is turned on so that the field electric current is supplied to the field coil 102. Thus, the AC generator 1 continues to generate the power generating operation to thereby charge the battery 5. When the output voltage of the AC generator 1 has been increased to 14.4 V and the relationship has been established that the voltage at point F is greater than the voltage at point E, the level of the output from the comparator CP3a is becomes low so that the transistor Q3 is turned off, the field electric current is reduced, and the generator output power is reduced.

In a case where the duty ratio of the duty signal is set to a range from a value, with which the voltage at point A is made equal to the voltage at point C, which is the second predetermined value, to 100%, the relationship is established that the voltage at point C is less than the voltage at point A during the period in which the duty ratio is within the set range. Thus, the level of the output from the comparator CP2 becomes high, and the level of the output from the comparator CP1 becomes low.

Since the outputs from the comparators CP3b and CP4 are disabled, the output from the comparator CP3b is supplied to the transistor Q3 through the diode D5b. In a period in which the generator output voltage has not increased to the usual level of 14.2 V and the relationship is established that the voltage at point G is greater than the voltage at point F, the transistor Q3 is turned on so that the field electric current is allowed to flow into the field coil 102. Thus, the power generating operation of the AC generator 1 is continued to charge the battery 5. When the generator output voltage has increased to 14.2 V and the relationship is established that the voltage at point F is greater than the voltage at point G, the output from the comparator CP3a is brought to the low level, thus turning off the transistor Q3. As a result, the field electric current is reduced to decrease the output power of the AC generator 1.

In a case where the voltage at point B is less than the voltage at point A which is in turn less than the voltage at point C, the levels of the outputs from the comparators CP1 and CP2 become low, turning off the transistors Q4a and Q4b. Thus, the outputs from the comparators CP3a and CP3b are disabled, so the output from the comparator CP4 is supplied to the transistor Q3 through the diode D6. Therefore, when the duty ratio of the duty signal is varied to change the level of the voltage at point A from a level higher than the voltage at point B to the level of the voltage at point C, the voltage at point A corresponding to the duty ratio is supplied to the positive input terminal of the comparator CP4, and the voltage at point F in proportion to the generator output voltage is supplied to the negative input terminal of the comparator CP4.

When the level of the voltage at point F in proportion to the generator output voltage has increased to the level of the voltage at point A corresponding to the present duty ratio, the comparator CP3 supplies a low level signal to the transistor Q3 which is thereby turned off. When the duty ratio is varied to change the level of the voltage at point A, the comparator CP3 generates a low level signal to the transistor Q3 after the voltage at point F has increased to the level of the voltage at point A corresponding to the changed duty ratio. In this manner, the adjustment voltage for the AC generator 1 can be set to an arbitrary value.

In the first to third embodiments, the control signal supplied from the control unit 4 to the voltage regulator is in the form of a pulse signal that is able to change the duty ratio thereof. However, the control signal may be in the form of a repeated signal of a variable frequency which can be changed as necessary, the frequency of the repeated signal being adapted to be converted into a corresponding voltage by means of a frequency-to-voltage converter before it is sent from the control unit 4 to the voltage regulator.

Fourth Embodiment

In the first to third embodiments, the reference voltage for controlling the usual voltage level is obtained from the divided voltage which is given by simply dividing the voltage of the constant-voltage power source A by the voltage dividing resistors 310, 311, (311a, 311b), 312 and 317. Thus, the reference voltages employed in these embodiments have no temperature characteristics. That is, in the foregoing embodiments, the usual adjustment voltage for the AC generator is not corrected or varied in accordance with a change in the ambient temperature.

Figure 6:
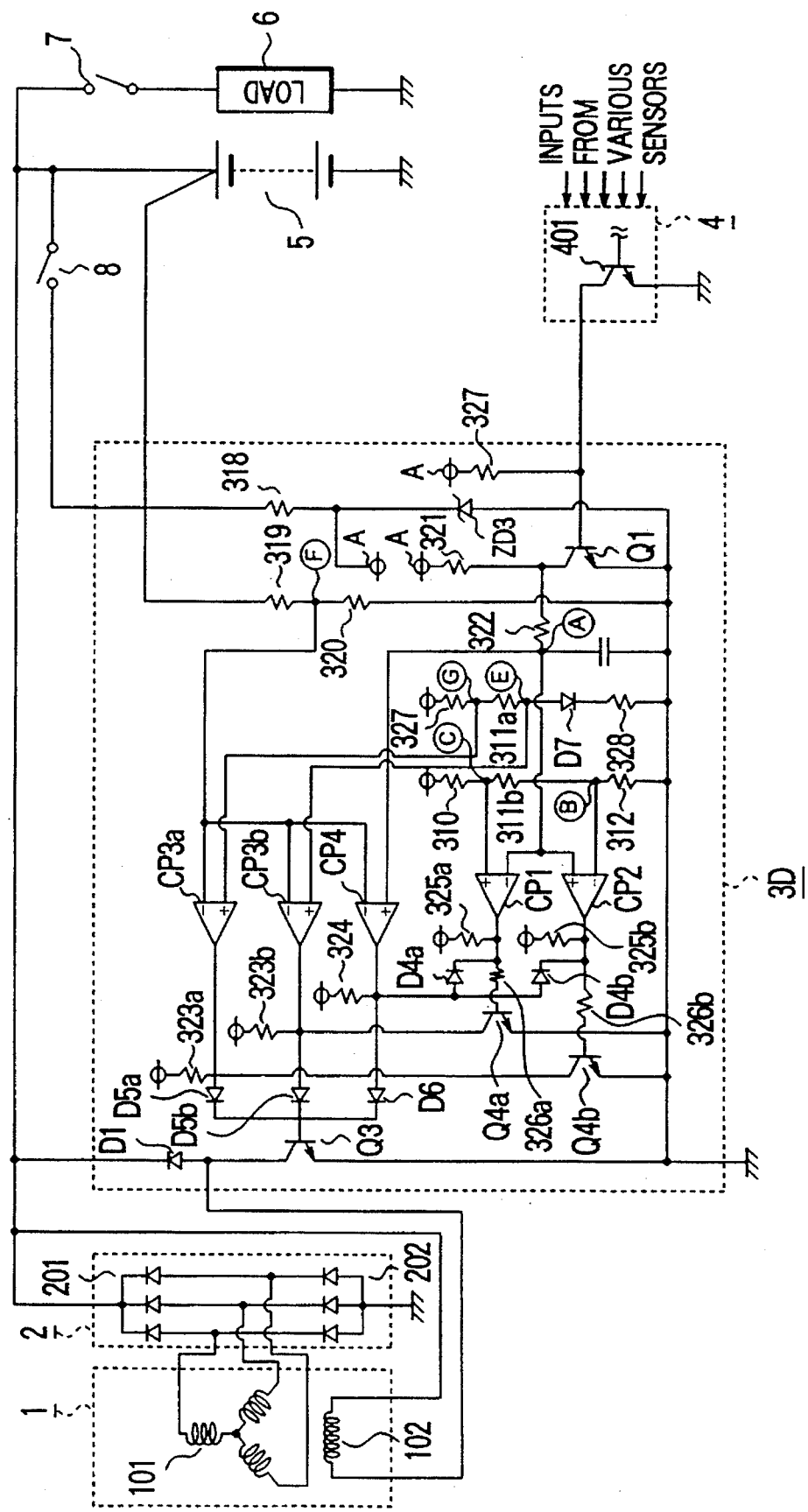
FIG. 6 is a diagram which illustrates the structure of an apparatus for controlling an output of an AC generator for a vehicle according to a fourth embodiment of the present invention.

FIG. 6 shows a fourth embodiment of the present invention in which a voltage regulator 3D includes a reference voltage circuit for controlling the usual adjustment voltage and providing a reference voltage with a temperature characteristic. The reference voltage circuit comprises a resistor division circuit including resistors 327 and 328, a diode D7 and a voltage dividing resistor 328 connected in series, the resistor division circuit being operable to provide the reference voltage with a temperature characteristic by means of the diode D7. Accordingly, even if the reference voltage is raised due to a rise in the ambient temperature, the voltage between the opposite ends of the diode D7 is decreased in accordance with the rise in the ambient temperature. Therefore, the usual adjustment voltage can be reduced to a predetermined value with a predetermined temperature coefficient in accordance with the rise in the ambient temperature.

This embodiment provides the following advantages. An optimum adjusted generator voltage for charging of the battery can be obtained in the course of controlling the usual adjustment voltage; the adjustment voltage for the AC generator can be controlled precisely in response to a control signal supplied from the control unit to the voltage regulator irrespective of a change in the ambient temperature; and the output voltage of the AC generator can be controlled to an arbitrary adjustment voltage in response to the control signal.

Fifth Embodiment

In the first to fourth embodiments, the signal for controlling switching between the comparator CP3, which controls the usual adjustment voltage such that the adjustment voltage is made to be the usual level, and the comparator CP4, which arbitrarily controls the adjustment voltage in response to a control signal, is a voltage signal with which the capacitor is charged and which has a variable voltage determined in accordance with the duty ratio of the duty signal. As an alternative to this, the control unit may supply, to the voltage regulator, a constant-voltage signal which has a constant voltage corresponding to a charging voltage, and a constant-current signal for generating constant voltages corresponding to the charging voltage across the resistor.

Figure 7:
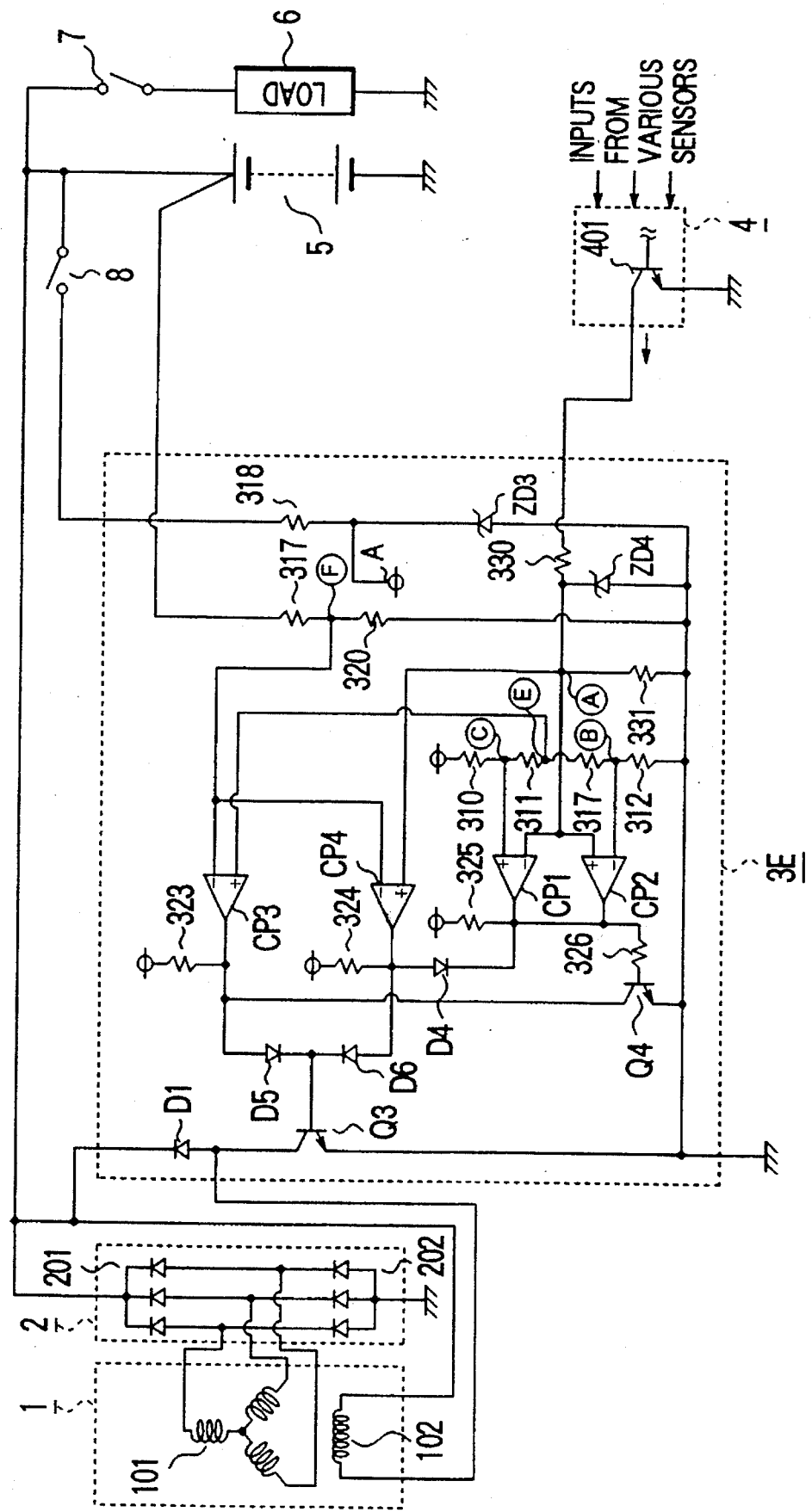
FIG. 7 is a diagram which illustrates the structure of an apparatus for controlling an output of an AC generator for a vehicle according to a fifth embodiment of the present invention.

FIG. 7 illustrates a fifth embodiment of the invention for performing such control. This embodiment is substantially similar to the second embodiment of FIG. 2 but differs therefrom the following features. Namely, a control unit 4A of this embodiment is constructed such that it generates a constant-voltage signal or a constant-current signal, which is a control signal for controlling switching between comparators CP3 and CP4. Further, a voltage regulator 3E of this embodiment is substantially similar to the voltage regulator 3B of FIG. 2 but is different therefrom in that the voltage regulator 3E does not includes the duty determination circuit of FIG. 2 comprising the charging resistor 321, the discharging resistor 322, the capacitor CA and the transistor Q1. However, the voltage regulator 3E includes: an input signal detection circuit comprising an input-protective resistor 330, an end of which is connected to an output terminal of the control unit 4A, another end of which is commonly connected to a junction A between a negative input terminal of a comparator CP1, a positive input terminal of a comparator CP2 and a positive input terminal of a comparator CP4 so as to protect inputs of the comparators CP1, CP2 and CP4; a surge protective Zener diode ZD4, a cathode of which is commonly connected to the junction A between the comparators CP1, CP2 and CP4, and an anode of which is grounded so as to protect the comparators CP1, CP2 and CP4 from surging; and a input signal detection resistor 331 connected in parallel to the surge protective Zener diode ZD4.

Figure 8:
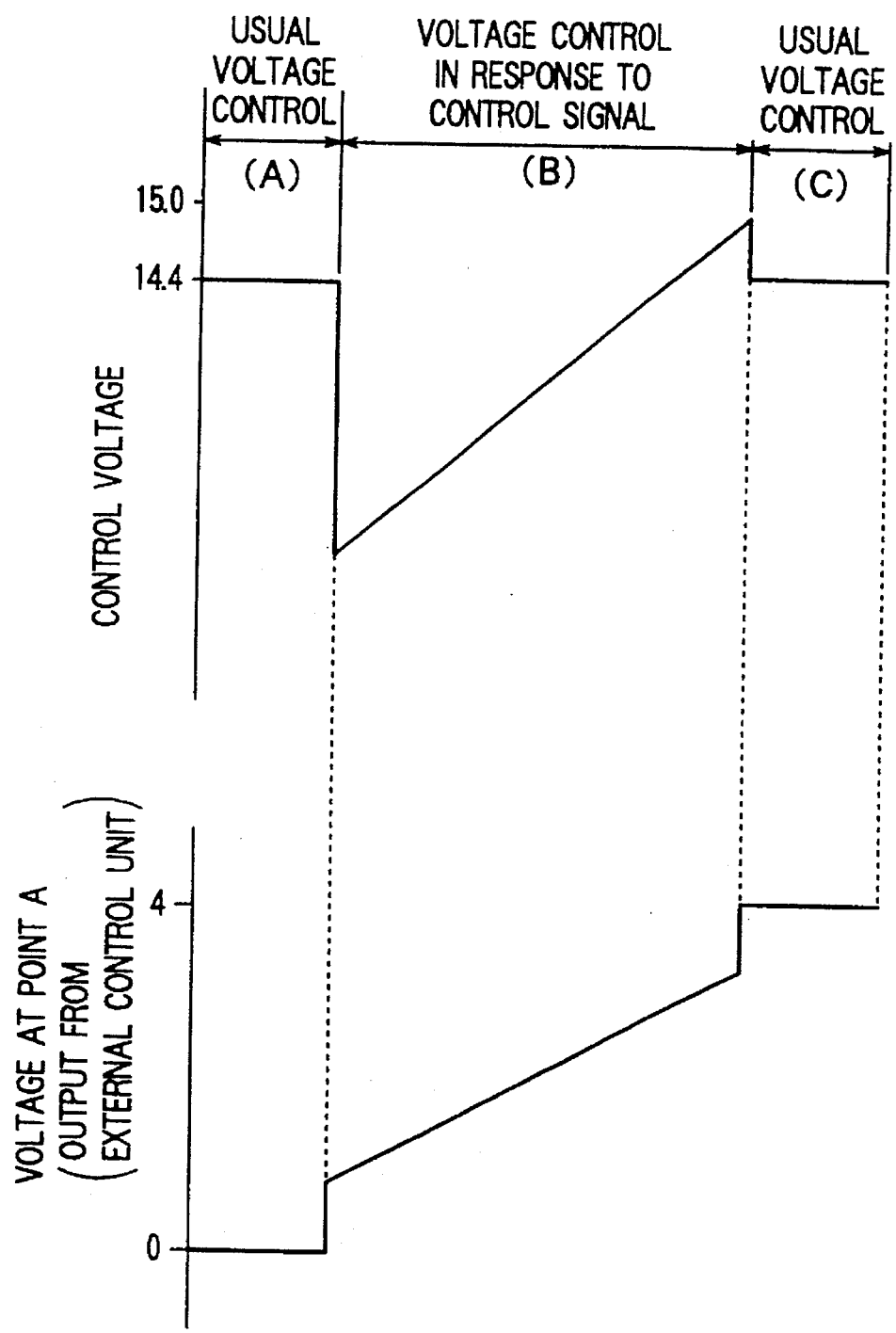
FIG. 8 is a characteristic graph showing the adjustment voltage of the apparatus for controlling the output of the AC generator according the fifth embodiment.

The operation of this embodiment will now be described with reference to a characteristic graph shown in FIG. 8.

In a case where a constant-voltage signal of, for example, zero volts is supplied from the control unit 4A to the voltage regulator 3E, the voltage at point A is of course 0 V, rendering the output of the comparator CP1 to the high level and the output of the comparator CP2 to the low level. As a result, the transistor Q4 is turned off, enabling the output of the comparator CP3 and at the same time disabling the output of the comparator CP4.

If the input voltage (i.e., the voltage of the control signal) from the control unit 4A is, for example, 4 V, which is the highest voltage, the voltage at point A is, of course, 4 V, rendering the output of the comparator CP1 to the low level and the output of the comparator CP2 to the high level. As a result, the transistor Q4 is turned off, enabling the output of the comparator CP3 and disabling the output of the comparator CP4.

The output voltage of the AC generator 1 is adjusted to fall into a first usual adjustment voltage control range (A) in the case where the input voltage to the voltage regulator 3E (i.e., the voltage of the control signal) is 0 V, whereas it is adjusted to fall into a second usual adjustment voltage control range (C) in the case where the input voltage is 4 V. In a period in which the voltage at point F to be supplied to the negative input terminal of the comparator CP3 is lower than the voltage at point E, the level of the output from the comparator CP3 is low. As a result, the transistor Q3 is conductive so that a field electric current is supplied to the field coil 102, allowing the AC generator 1 to continue power generation. When the voltage of generator output power has increased to 14.4 V, the voltage at point F becomes higher than the voltage at point E, so the output of the comparator CP3 is inverted from the low to the high level to thereby turn the transistor Q3 off, reducing the field electric current supplied to the field coil 102. As a result, the output voltage of the AC generator 1 can be adjusted to 14.4 V.

In a case where the input voltage form the control unit 4A is set to a range from 0 V to 4 V with the voltage at point A being equal to or greater than the voltage at point B and less than the voltage at point C, both of the levels of the outputs from the comparators CP1 and CP2 are high, so the transistor Q4 is conductive. Thus, the output of the comparator CP3 is disabled, and the output of the comparator CP4 is enabled. As a result, the adjustment voltage or output voltage of the AC generator 1 can be controlled to fall within a third adjustment voltage control range (B), which lies between the first and second adjustment voltage control ranges (A) and (C), in response to the control signal from the control unit 4A.

Therefore, in the case where the voltage at point A is set to a value with the input voltage being variable from 0+n (V) to 4−n (V), the output of the comparator CP4 becomes low, turning the transistor Q3 off when the voltage at point F increases to reach the voltage at point A in accordance with the increasing output voltage of the AC generator 1. As a result, the output voltage of the AC generator 1 can be adjusted to a value which is arbitrarily set by the control unit 4A.

In the foregoing description, the control unit 4A directly transmits the constant voltage signal from the control unit 4A, which corresponds to the adjustment or target voltage to which the generator output voltage is to be adjusted, to the voltage regulator 3E so as to develop a voltage equal to the constant-voltage signal at point A. However, a constant-current signal may be transmitted, in place of the constant-voltage signal, from the control unit 4A to the voltage regulator 3E so as to develop a voltage drop across the resistor 331, thus generating a corresponding voltage at point A.

Sixth Embodiment

Although the first to fifth embodiments are constructed such that the generator output voltage is linearly changed in proportion to a change in the level of a duty signal or a constant-voltage signal or a constant-current signal supplied from the control unit to the voltage regulator, the adjustment voltage of the AC generator 1 can be changed to plural levels in accordance with the variable duty ratio of the duty signal.

Figure 9:
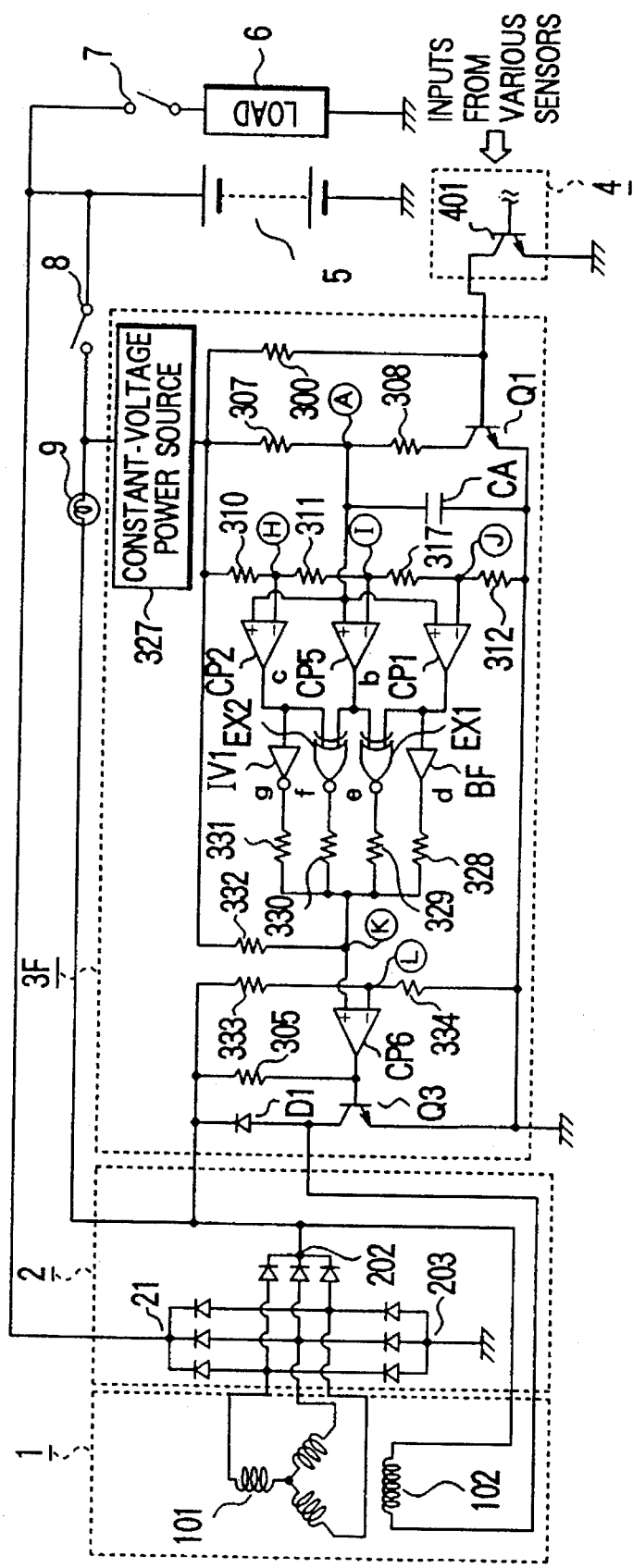
FIG. 9 is a diagram which illustrates the structure of an apparatus for controlling an output of an AC generator for a vehicle according to a sixth embodiment of the present invention.

FIG. 9 illustrates a sixth embodiment of the present invention which performs such control. In this FIG., the same reference numerals as those employed in FIG. 7 represent the same or corresponding elements of FIG. 7. A voltage regulator 3F according to this embodiment includes: a constant-voltage power source 327 for controlling the generator output voltage transmitted from a sub-terminal 202 of a rectifier 2 to a constant voltage; a plurality of voltage dividing resistors 310, 311, 317 and 312 connected in series between an output terminal of the constant-voltage power source 327 and ground; and a plurality of comparators CP2, CP5 and CP1 having their negative input terminals respectively connected to corresponding junctions or connection points H, I and J of the respective voltage dividing resistors 310, 311, 317 and 312 so as to receive corresponding reference voltages, and their positive input terminals commonly connected to one end of a capacitor CA so as to compare the voltage to be charged to the capacitor CA with the respective reference voltages.

The voltage regulator 3F further includes: a buffer BF whose input terminal is connected to an output terminal of the comparator CP1; an exclusive NOR gate (hereinafter referred to as "EX-NOR") EX1 whose input terminal is connected to each of the output terminals of the comparators CP1 and CP5; an EX-NOR (EX2) whose input terminal is connected to the output terminals of the comparators CP5 and CP2; an inverter IV whose input terminal is connected to the output terminal of the comparator CP2; and a plurality of voltage dividing resistors 328 to 331 whose one ends are respectively connected to the output terminals of the corresponding logic devices BF, EX-NORs 1, 2 and INV, and whose the other ends are commonly connected to one end of a voltage dividing resistor 332 whose other end is connected to the constant-voltage power source 327. The output of each of the logic devices BF, EX-NORs 1, 2 and the INV is formed into an open collector structure, so that when the level of at least one of the these output terminals becomes low, a corresponding one of the voltage dividing resistors 328-331 is grounded and thus connected in series to the voltage dividing resistor 332.

The voltage regulator 3F further includes: voltage dividing resistors 333, 334 connected in series between the sub-terminal 202 and ground; and a comparator CP6 having a negative input terminal connected to a connection point between the voltage dividing resistors 333 and 334, and a positive input terminal connected to a common connection point of the voltage dividing resistors 328 to 332, and an output terminal connected to a transistor Q3.

Figures 10, 11:
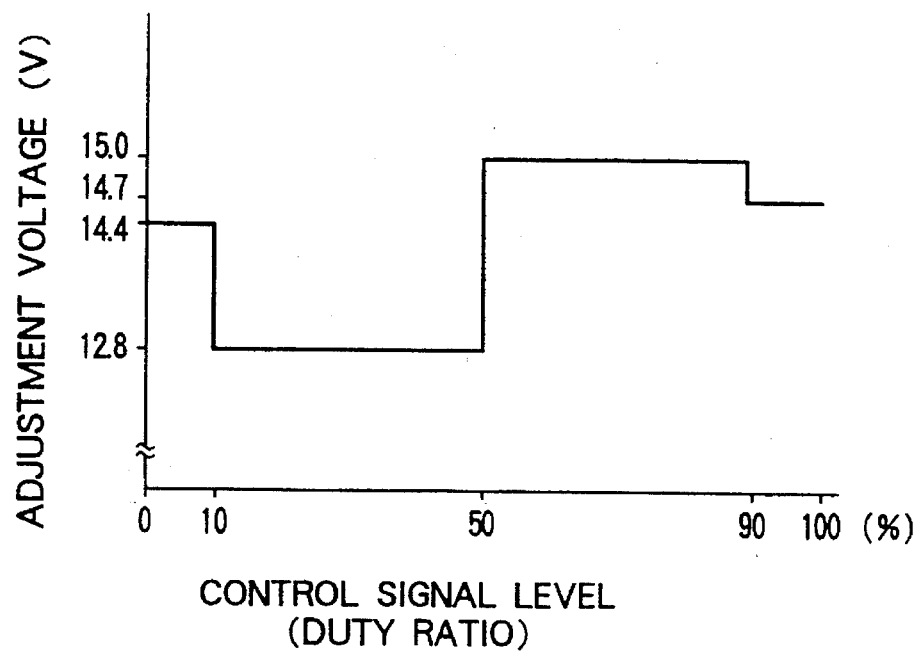
FIG. 10 is a logic (truth value) table illustrating the operation of the apparatus for controlling the output of the AC generator according to the sixth embodiment.
FIG. 11 is a characteristic graph showing the adjustment voltage of the AC generator according the sixth embodiment.

FIG. 10 is a truth table showing states of outputs a, b and c from the comparators CP1, CP5 and CP2 corresponding to the respective duty ranges as well as states of outputs d, e, f and g from the respective logic devices BF, EX1, EX2 and INV in a case where the duty ratio of the duty signal from the control unit 4 is set to 0%–10%, 10%–50%, and 50%–100%. FIG. 11 is a graph showing the state of change in the adjustment voltage corresponding to the duty ratio of the duty signal from the control unit 4.

The operation of this embodiment will now be described while referring to FIGS. 10 and 11.

When the engine of a vehicle has been started and thus the AC generator 1 starts generating electric power, the comparator CP6 of the voltage regulator 3F compares the reference voltage at point K, supplied to the positive input terminal thereof, with the voltage at point L which is supplied to the negative input terminal thereof and which is the divided voltage of the output voltage of the AC generator 1 that is output from the sub-terminal 202. If the voltage at point L is higher than the reference voltage at point K, the comparator CP6 inverts the output thereof from the high to the low level.

If the voltage at point L becomes low on the contrary, the output from the comparator CP6 is inverted from the low to the high level. Thus, the transistor Q3 repeats conductive and non-conductive states in accordance with changes in the output from the comparator CP6. When the transistor Q3 is in the conductive state, it continues to supply a field electric current to the field coil 102. When the transistor Q3 is in the nonconductive state, it interrupts the field electric current. As described above, the comparator CP6 controls the output voltage from the AC generator 1 to a predetermined value corresponding to the reference voltage applied to the comparator CP6.

The reference voltage for the comparator CP6 will now be described. The duty signal from the control unit 4 is detected, as an ON/OFF signal output from the transistor 401, by the transistor Q1 of the voltage regulator 3F.

The transistor Q1 is in the conductive state when the duty ratio of the ON/OFF signal from the transistor 401 is 0%. When the duty ratio is 100%, the transistor Q1 is in the interrupted state. The magnitude of a voltage charging the capacitor CA is changed in accordance with the ON/OFF operation of the transistor Q1. That is, the capacitor CA is electrically charged through the resistor 307 when the transistor Q1 is turned off, while it discharges through the resistor 308 and the transistor Q1 when the transistor Q1 is in the conductive state.

Therefore, when the duty ratio is 100%, the base voltage of the transistor Q1 is grounded through the transistor 401 so that the transistor Q1 is turned off. As a result, the capacitor CA is electrically charged through the resistor 307 to a level equal to the output voltage from the constant-voltage power source 327, the charged level being at the highest level. If the duty ratio is 0%, the transistor Q1 remains conductive so that the capacitor CA is electrically charged to a level which is equal to the division of the output voltage from the constant-voltage power source 327 by the resistances of the resistors 307 and 308, the charged level at this time being at the lowest level. In the range of the duty ratio from 0% to 100%, the capacitor CA is charged with the voltage which is substantially in proportion to the duty ratio in the range from the highest level to the lowest level so that the duty ratio of the control signal is changed to a corresponding voltage.

The voltage charging the capacitor CA is supplied to the positive input terminal of each of the comparators CP1, CP5 and CP2. The divided voltages developed by the voltage dividing resistors 310, 311, 317 and 312 are supplied to the corresponding negative input terminals of the comparators so for comparison with the charging voltage. In accordance with the result of the comparison, each of the comparators CP1, CP5 and CP2 generates a high-level or low-level signal so that the voltage for charging of the capacitor CA, i.e., the state of the duty signal, is determined.

The operation of each comparator will now be described while referring to the truth table shown in FIG. 10.

When the duty ratio of the duty signal is between 0% and 10% (0%–10%), the charging voltage is lower than the divided voltages at points H, I and J, respectively, supplied to the negative input terminals of the comparators CP2, CP5 and CP1. Therefore, the comparators CP2, CP5 and CP1 generate low-level signals.

When the duty ratio of the duty signal is between 10% and 50% ( 10%–50% ), the charging voltage is lower than the divided voltages at points H and I, respectively, supplied to the negative input terminals of the comparators CP2 and CP5. Therefore, the comparators CP5 and CP2 generate low-level signals. Since the charging voltage is higher than the divided voltage at point J, the comparator CP1 generates a high-level signal.

When the duty ratio of the duty signal is between 50% and 90% (50%–90% ), the charging voltage is lower than the divided voltage at point H supplied to the negative input terminal of the comparator CP2, but it is higher than the divided voltages at points I and J. Therefore, the comparator CP1 generates a high-level signal but the comparator CP2 generates a low-level signal.

When the duty ratio of the duty signal is between 90% and 100% (90%–100%), the charging voltage is higher than the divided voltages at points H, I and J, respectively, supplied to the negative input terminals of the comparators CP2, CP5 and CP1. Therefore, the comparator a (i.e., comparator CP2), the comparator b (i.e., comparator CP5) and the comparator c (i.e., comparator CP1) generate high-level signals.

The outputs from the three comparators CP1, CP5 and CP2 are supplied to four gates (i.e., the buffer BF, the EX-NORs EX1, EX2, and the inverter INV) for signal processing. That is, when the duty ratio is 0%–10%, only the buffer BF (i.e., gate d), which receives a low-level signal supplied from the comparator CP1, generates a low-level signal. When the duty ratio is 10%–50%, only the EX-NOR EX1 (i.e., gate e), which inverts the result of the EX-NOR of the high and low levels of the output signals from the comparators CP1 and CP5, generates a low-level signal.

When the duty ratio is 50%–90%, only the EX-NOR EX2 (i.e., gate f), which inverts the result of the EX-NOR of the high and low levels of the output signals from the comparators CP5 and CP2, generates a low-level signal.

When the duty ratio is 90%–100%, only the inverter INV (i.e., gate g), which inverts the output signal from the comparator CP2, generates a low-level signal.

That is, the arrangement is such that anyone of the four gates d, e, f and g generates a low-level signal in accordance with the duty ratio which is obtained by dividing the entire duty ratio range of from 0% to 100% into four sections.

The output terminals of the four gates d, e, f and g are respectively connected to the resistors 328, 329, 330 and 331 which provide a reference voltage for the comparator CP6. When the output signal from anyone of the gates d, e, f and g is changed into the low level in response to the duty signal, the voltage dividing resistor 328, 329, 330 or 331 connected to the output terminal of the now low-level gate is grounded. As a result, the voltage dividing resistor 328, 329, 330 or 331 is, together with the voltage dividing resistor 332, connected in series between the output terminal of the constant-voltage power source 327 and ground. Thus, the voltage dividing resistor 332 and the voltage dividing resistor 328, 329, 330 or 331 serves to appropriately divide the output voltage from the constant-voltage power source 228 to provide a reference voltage which is supplied to the positive input terminal of the comparator CP6.

That is, when the duty ratio is 0%–10%, the voltage dividing resistor 328 is grounded and connected in series to the voltage dividing resistor 332. Then, the reference voltage is supplied from the point K to the positive input terminal of the comparator CP6 for comparison with the divided voltage of the generator output power which is supplied to the negative input terminal of the comparator CP6. If the generator output voltage is lower than 14.4 V, which is the usual adjustment voltage, and if its divided voltage is lower than the reference voltage, the comparator CP6 continuously generates a high-level signal to the transistor Q3 so that the transistor Q3 is held conductive, allowing the field electric current to be supplied to the field coil 102. When the generator output voltage increases above such a level that the divided voltage thereof becomes higher than the reference voltage, the comparator CP6 generates a low-level signal to thereby turn the transistor Q3 off. As a result, the generator output voltage can be adjusted to 14.4 V, as shown in FIG. 11.

When the duty ratio is 10%–50%, the voltage dividing resistor 329 is grounded; when the duty ratio is 50%–90%, the voltage dividing resistor 330 is grounded; and when the duty ratio is 90%–100%, the voltage dividing resistor 331 is grounded. Since a valid or effective voltage dividing resistor is thus switched over to change the reference voltage in accordance with the duty ratio of the control signal from the control unit, the comparator CP6 generates a low-level signal when it is supplied with a divided voltage corresponding to the reference voltage.

As a result, in the case where the duty ratio is 10%–50%, the field electric current is interrupted to adjust the generator output voltage when the latter is 12.8 V which is lower than the usual adjustment voltage. In the case where the duty ratio is 50%–90%, the field electric current is interrupted when the generator output voltage is 15.0 V which is higher than the usual adjustment voltage. In the case where the duty ratio is 90%·100%, the field electric current is interrupted when the generator output voltage is 14.7 V which is somewhat higher than the usual adjustment voltage.

Seventh Embodiment

In the first to fifth embodiments, a comparator for changing the set value for the adjustment or target generator voltage is employed separately from a comparator for setting the usual adjusted generator voltage in the case where the set value of the adjusted generator voltage is linearly changed in the range from the lowest to the highest value. However, a voltage regulator can be employed which is capable of linearly setting the adjustment voltage without a necessity of considerably modifying the conventional voltage regulator 3—3 shown in FIG. 20 in order to fabricate the apparatus for controlling an output of an AC generator for a vehicle at low cost.

Figure 12:
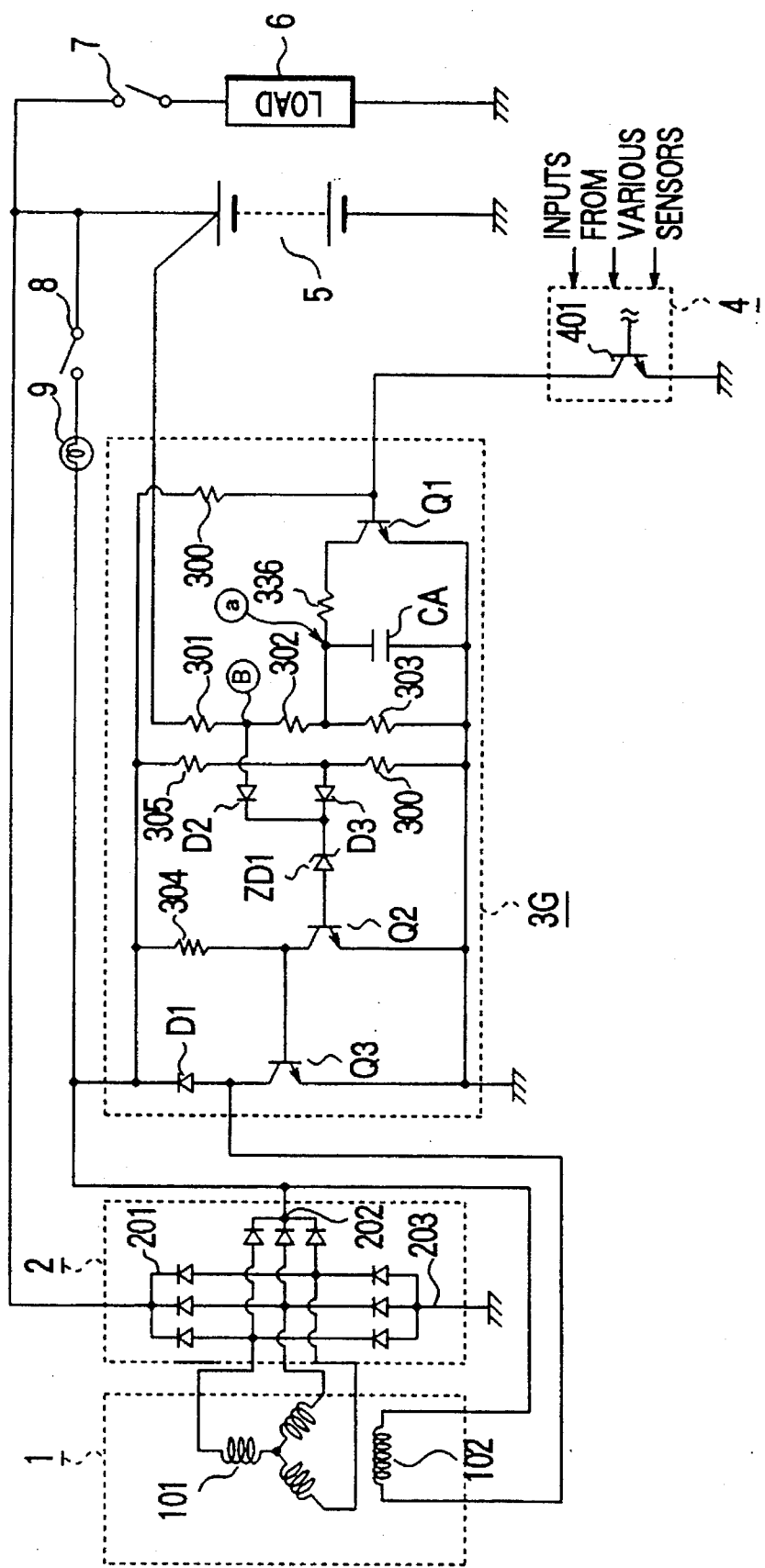
FIG. 12 is a diagram which illustrates the structure of an apparatus for controlling an output of an AC generator for a vehicle according to a seventh embodiment of the present invention.

FIG. 12 illustrates a seventh embodiment employing such a voltage regulator. Referring to FIG. 12, the same reference numerals as those shown in FIG. 20 represent the same or corresponding elements. In this FIG., a voltage regulator 3G of this embodiment includes a duty-voltage conversion circuit which comprises a smoothing capacitor CA connected in parallel to a voltage dividing resistor 303, and a voltage dividing resistor 336 connected between a collector of a transistor Q1 and a positive input terminal of the smoothing capacitor CA in such a manner that the voltage dividing resistor 336 is made to connect in parallel to the smoothing capacitor CA when the transistor Q1 is turned on.

The operation of this embodiment will now be described. The operation of this embodiment is substantially the same as the foregoing embodiments from the moment the key switch 8 is turned on to cause the field electric current to flow from the battery 5 to the field coil 102 through the indicator lamp 9 and the transistor Q3 so that the power generating operation of the AC generator 1 is started to a moment the usual adjustment voltage is generated at the sub-terminal 202 to turn off the indicator lamp 9.

When the duty ratio of a duty signal generated by the transistor 401 of the control unit 4 is 0%, the transistor Q1 in in the conductive state. Therefore, the voltage dividing resistor 336 is grounded through the transistor Q1 so that it is connected in parallel to the voltage dividing resistor 303. Thus, the resistance-divided voltage ratio at the point B is lowered, causing a divided voltage corresponding to the divided voltage ratio to be supplied to the cathode of the Zener diode ZD1 through the diode D2.

That is, a predetermined offset voltage is supplied to the Zener diode ZD1. When the voltage of generated electric power is increased to, for example, 14.4 V in the foregoing state, the voltage at point B is instantaneously raised to the breakdown voltage for the Zener diode ZD1 to turn the transistor Q2 on and turn the transistor Q3 off.

If the duty ratio of the duty signal is 100% and the transistor Q1 is turned off, the voltage dividing resistor 336 connected in parallel to the voltage dividing resistor 303 is separated. As a result, the resistance-divided voltage ratio at point B is raised and the divided voltage corresponding to the divided voltage ratio is supplied to the cathode of the Zener diode ZD1 through the diode D2.

Thus, the offset voltage to be supplied to the Zener diode ZD1 is raised as compared with the case where the resistance-divided voltage ratio is low. If the voltage of the generator output power has increased to, for example, 12.8 V, the voltage at point B is instantaneously raised to the breakdown voltage for the Zener diode ZD1, causing the transistor Q2 to be turned on and the transistor Q3 to be turned off. As a result, by controlling the duty ratio to 0% or 100%, the generator output voltage can be adjusted to 14.4 V or 12.8 V.

Figure 13:
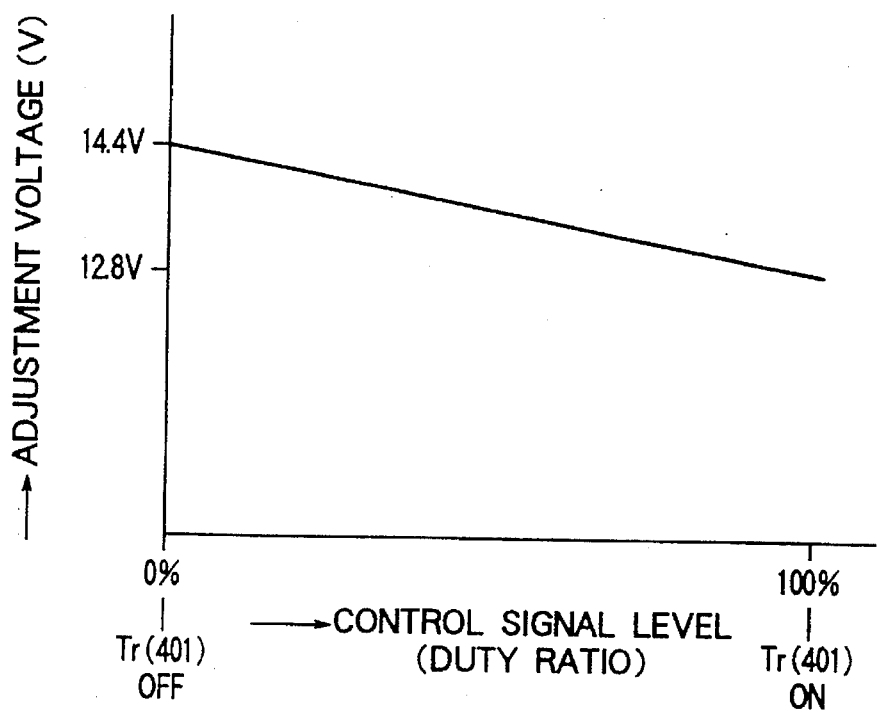
FIG. 13 is a characteristic graph showing the adjustment voltage of the AC generator according the seventh embodiment.

In a case where the adjustment or target voltage for generator output power is linearly set in a range from 14.4 V to 12.8 V as shown in FIG. 13, the transistor Q1 is turned on and off at the duty ratio corresponding to the adjustment or target voltage as set, to thereby repeatedly change the divided voltage in accordance with the duty ratio. At the same time, the divided voltage is smoothed by means of the smoothing capacitor CA.

Figure 14:
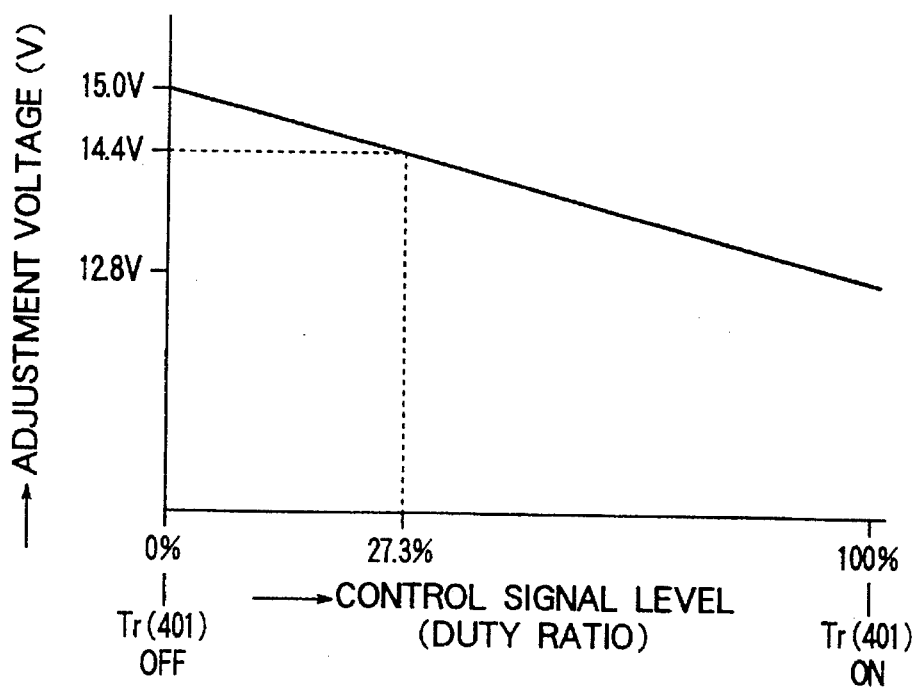
FIG. 14 is another characteristic graph showing the adjustment voltage of the AC generator according the seventh embodiment.

As a result, a mean voltage of the divided voltage corresponding to the duty ratio can be obtained so that the offset voltage at point B is changed. Since the mean voltage increases as the duty ratio approaches 100%, the offset voltage also increases so that the adjustment voltage is changed as shown in FIG. 13. Although in this embodiment, the adjustment voltage is set to 14.4 V when the duty ratio is 0%, the adjustment voltage may be set to 15.0 V when the duty ratio is 0%, 14.4 V when the duty ratio is 27.3%, and 12.8 V when the duty ratio is 100%, by properly setting the resistance values of voltage dividing resistors 301 to 303 and 336 as shown in a graph of FIG. 14.

Eighth Embodiment

Although the seventh embodiment is constructed such that the adjustment voltage decreases corresponding to a rise in the duty ratio such that the adjustment voltage is 14.4 V when the duty ratio is 0%, and 12.8 V when the duty ratio is 100%, this characteristic or relationship of the adjustment voltage and the duty ratio may be inverted to improve the flexibility in using the voltage regulator.

Figure 15:
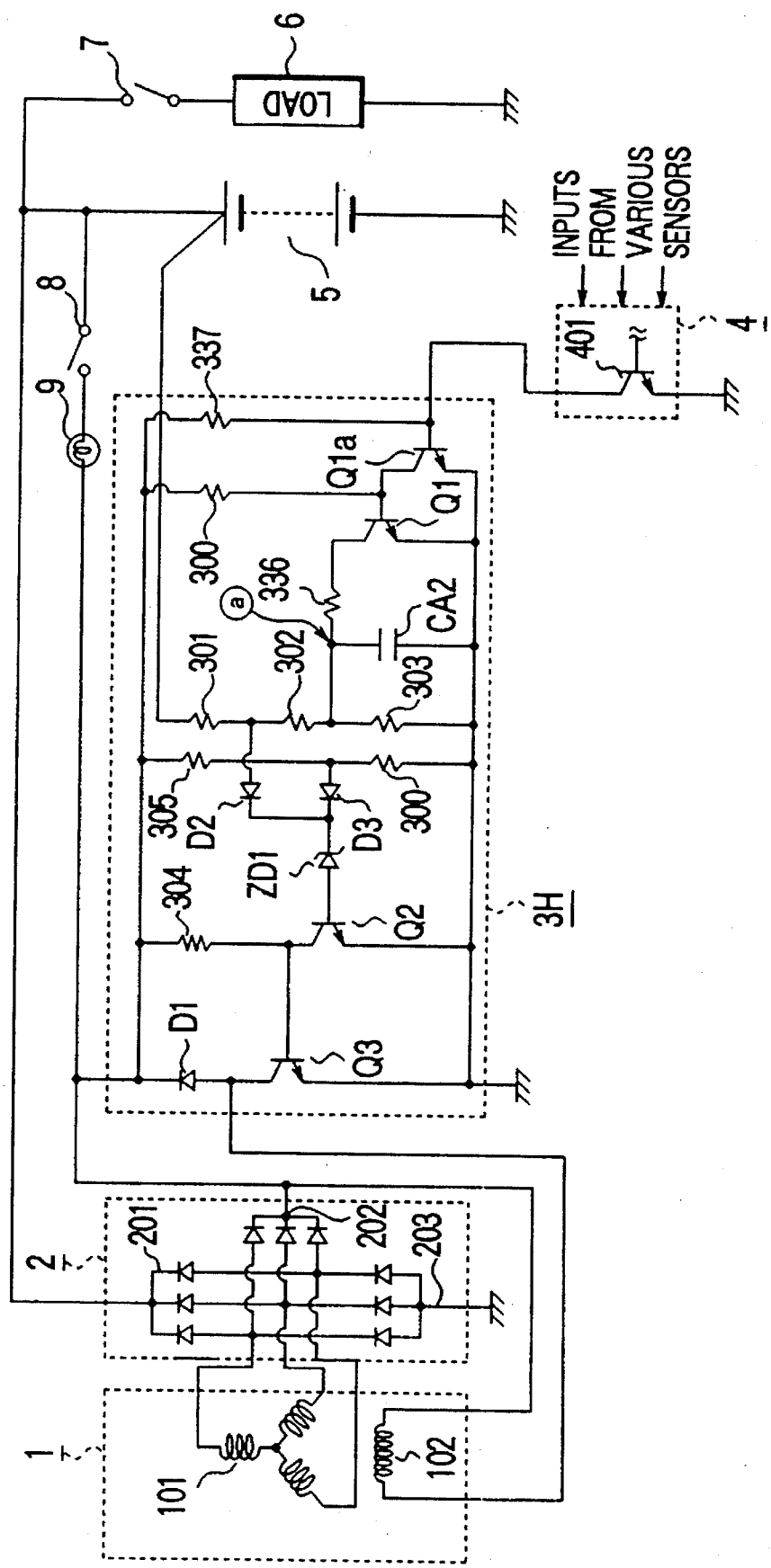
FIG. 15 is a diagram which illustrates the structure of an apparatus for controlling an output of an AC generator for a vehicle according to an eighth embodiment of the present invention.

FIG. 15 illustrates an eighth embodiment having such a characteristic or relationship. In this FIG., the same reference numerals as those employed in FIG. 12 represent the same or corresponding elements.

A voltage regulator 3H of this embodiment includes, in addition to the same components of the voltage regulator 3G of FIG. 12, a transistor Q1a for inverting an output of a transistor 401 in a control unit 4A, the transistor Q1a having a base connected to a collector of the transistor 401, a collector connected to a base of the ensuing transistor Q1 and an emitter connected to an emitter of the transistor Q1. The voltage regulator 3H further includes a base resistor 337 connected between the base of the transistor QIa and a power supply line connected to a positive terminal of a battery 5 through an indicator lamp 9 and a key switch 8.

The operation of this embodiment will now be described. In a case where the duty ratio of a duty signal from the control unit 4 is 0%, a base current flows into the transistor Q1a through the base resistor 337, so that the transistor Q1a is rendered conductive to thereby turn the transistor Q1 off. Since no resistor is connected in parallel to the voltage dividing resistor 303, the resistance-divided voltage ratio at point B is increased so that a divided voltage corresponding to the divided voltage ratio is supplied to a cathode of a Zener diode ZD1 through a diode D2.

The offset voltage to be supplied to the Zener diode ZD1 increases as compared with the case where the resistance-divided voltage ratio is low. If the voltage of the generator output power has increased to, for example, 12.8 V, the voltage at point B is instantaneously raised to the breakdown voltage for the Zener diode ZD1 to turn the transistor Q2 on and turn the transistor Q3 off.

In a case where the duty ratio of the duty signal from the control unit 4 is 100%, the base current flowing into the transistor Q1a is interrupted so that the transistor Q1a is rendered non-conductive to thereby turn the transistor Q1 on. Thus, the voltage dividing resistor 336 is grounded through the transistor Q1 and connected in parallel to the voltage dividing resistor 303 so that the resistance-divided voltage ratio at point B is decreased. Thus, a divided voltage corresponding to the divided voltage ratio is supplied to the cathode of the Zener diode ZD1 through the diode D2.

That is, a predetermined offset voltage is supplied to the Zener diode ZD1. If the voltage of the generator output power has increased to, for example, 14.4 V, the voltage at point B is instantaneously raised to the breakdown voltage for the Zener diode ZD1 so that the transistor Q2 is turned on and the transistor Q3 is turned off.

In a case where the adjustment or target voltage is linearly set to a value in a range from 12.8 V to 14.4 V as shown in FIG. 13, the transistor Q1 is turned on and off at the duty ratio corresponding to the set adjustment voltage to repeatedly change the divided voltage in accordance with the duty ratio, and the divided voltage is smoothed by the smoothing capacitor CA.

Figure 16:
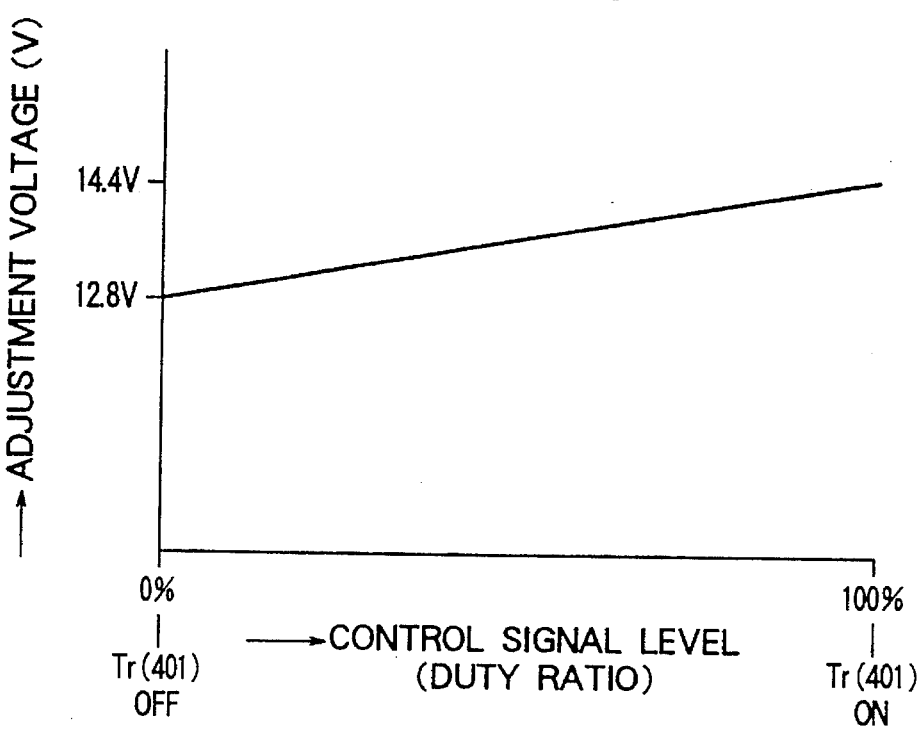
FIG. 16 is a characteristic graph showing the adjustment voltage of the AC generator according the eighth embodiment.
Figure 17:
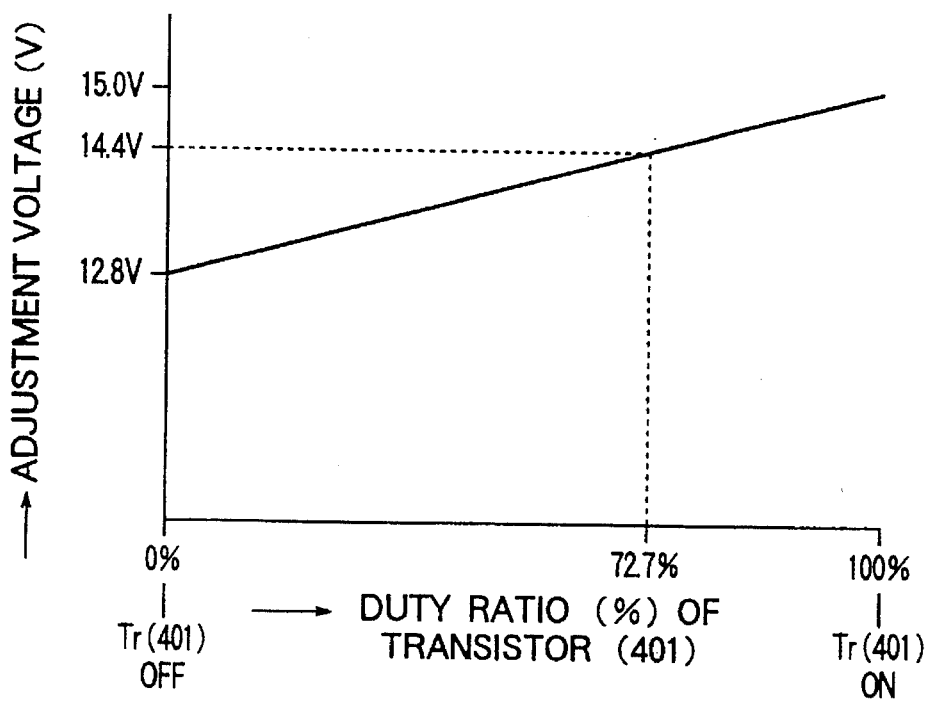
FIG. 17 is another characteristic graph showing the adjustment voltage of the AC generator according the eighth embodiment.

As a result, a mean voltage of the divided voltage corresponding to the duty ratio can be obtained so that the offset voltage at point B is changed. Since the mean voltage decreases as the duty ratio approaches 100%, the offset voltage also decreases so that the adjustment voltage is raised as shown in FIG. 16. Although the adjustment voltage is set to 12.8 V when the duty ratio is 0%, the adjustment voltage may be set to 12.8 V when the duty ratio is 0%, 14.4 V when the duty ratio is 72.7%, and 15.5 V when the duty ratio is 100%, as shown in a characteristic graph of FIG. 17 by properly setting the resistance values of the voltage dividing resistors 301 to 303 and 336.

What is claimed is:

1. An apparatus for controlling an output of a vehicular AC generator which has a field coil in which the apparatus is connected to a battery for charging thereof, said apparatus comprising:

sensor means for sensing an operating condition of a vehicle on which said AC generator is installed and generating a corresponding output signal;

a control unit connected to said sensor means for generating a control signal which has duty ratio corresponding to the sensed operating condition of the vehicle; and a voltage regulator connected to said battery and said control unit for detecting an output voltage of said battery, receiving said control signal and controlling turning on/off of a field current supplied from said battery to said field coil both in accordance with said detected battery voltage and in response to said control signal so as to adjust an output voltage of said AC generator to a level that is determined in accordance with the duty ratio of the control signal supplied from said control unit to said voltage regulator.

2. The apparatus according to claim 1, wherein said voltage regulator comprises a duty ratio determination circuit that determines the duty ratio of the control signal and, in accordance with a result of the determination, sets the output voltage of said AC generator to an adjusted value.

3. The apparatus according to claim 1, wherein said control unit generates a control signal which optimizes the output voltage of said AC generator so as to be suited to the sensed operating condition of the vehicle, and said voltage regulator comprises a setting circuit for setting the output voltage of said AC generator to a value corresponding to the control signal.

4. The apparatus according to claim 2, wherein said duty determination circuit converts the duty ratio of the control signal to a corresponding voltage which is compared with a reference voltage by said voltage regulator.

5. The apparatus according to claim 3, wherein said setting circuit comprises a voltage dividing circuit having a plurality of resistors connected in series with each other between a power supply and ground so as to adjust a divided ratio of a voltage with which the control signal from said control unit is compared to thereby change the output voltage of said AC generator.

6. The apparatus according to claim 1, wherein said voltage regulator comprises:

signal level determination means for determining whether the level of the control signal supplied from said control unit to said voltage regulator is a first level which is lower than a first predetermined level, or a second level which is higher than a second predetermined level, or a third level which is between said first and second predetermined levels; and switch means for switching over the output voltage of said AC generator between at least two levels in accordance with the determination of said signal level determination means.

7. The apparatus according to claim 6, wherein said signal level determination means controls the output voltage of said AC generator to a usual predetermined level when said control signal is of the first level or the second level, and controls, when said control signal is of the third level, the output voltage of said AC generator to a variable level which varies in accordance with a change in the level of said control signal.

8. The apparatus according to claim 6, wherein said signal level determination means controls the output voltage of said AC generator to a first usual predetermined level when said control signal is of the first level, controls the output voltage of said AC generator to a second usual predetermined level when said control signal is of the second level, and controls, when said control signal is of the third level, the output voltage of said AC generator to a variable level which varies in accordance with a change in the level of said control signal.

9. The apparatus according to claim 1, wherein said control signal supplied from said control unit is in the form of a frequency signal of a variable frequency, said voltage regulator further comprising converting means for converting said frequency signal into a corresponding voltage.

10. The apparatus according to claim 1, wherein said voltage regulator switches over the output voltage of said AC generator into at least four stages in accordance with the level of the control signal supplied from said control unit to said voltage regulator.

11. The apparatus according to claim 10, wherein the level of said control signal is determined to switch over a reference voltage for said voltage regulator into a plurality of stages corresponding in number to the stages of the output voltage of said AC generator.

12. The apparatus according to claim 11, further comprising a plurality of detection means for detecting the level of the control signal, and logic determination means for determining a logic of the control signal detected by said detection means so as to change the level of said reference signal in accordance with a result of the determination.

13. The apparatus according to claim 12, wherein said voltage regulator further comprises determining means for determining an upper limit value and a lower limit value for the output voltage of said AC generator, switching means for switching over the output voltage of said AC generator between the upper limit value and the lower limit value determined by said determining means, and smoothing means for smoothing the switching-over between the switched upper limit value and lower limit value, wherein the adjustment voltage for said AC generator is linearly controlled in response to the control signal from said control unit.

14. The apparatus according to claim 13, wherein said control unit generates a control signal, the duty ratio of which is determined in accordance with whether the vehicle is driven in an idle driving mode in which the engine of the vehicle is idling with said AC generator being connected to no electric load, or in a constant electric load driving mode in which said AC generator is electrically connected to a constant electric load, or in a high electric load driving mode in which said AC generator is electrically connected to a high electric load.

15. The apparatus according to claim 1, wherein said sensor means is comprised of one or more sensors for detecting an idling operation, a constant electrical load operation and a high electrical load operation.

16. The apparatus according to claim 1, wherein said sensor means is comprised of one or more of a specific gravity sensor, an engine load sensor, and a vehicle speed sensor.

* * * * *